(12) United States Patent
Root et al.

(10) Patent No.: US 9,897,154 B2
(45) Date of Patent: Feb. 20, 2018

(54) DISK BRAKE HUB ASSEMBLY

(75) Inventors: Jeffrey T. Root, Howell, MI (US);
Jasen S. Drenth, Brighton, MI (US)

(73) Assignee: GUNITE CORPORATION, Rockford, IL (US)

( * ) Notice: Subject to any disclaimer, the term of this patent is extended or adjusted under 35 U.S.C. 154(b) by 896 days.

(21) Appl. No.: 13/077,883

(22) Filed: Mar. 31, 2011

(65) Prior Publication Data
US 2012/0247881 A1 Oct. 4, 2012

(51) Int. Cl.
*F16D 65/12* (2006.01)
*B60B 27/00* (2006.01)

(52) U.S. Cl.
CPC ........ *F16D 65/123* (2013.01); *B60B 27/0052* (2013.01); *F16D 2200/003* (2013.01); *F16D 2200/0021* (2013.01); *F16D 2200/0039* (2013.01)

(58) Field of Classification Search
CPC ..... F16D 2065/1392; F16D 2065/1316; F16D 2065/136; F16D 65/12; F16D 65/123
USPC ........................... 188/218 XL, 18 A; 301/6.8
See application file for complete search history.

(56) References Cited

U.S. PATENT DOCUMENTS

| | | | |
|---|---|---|---|
| 1,473,140 A | 11/1923 | Church | |
| 2,753,959 A | 7/1956 | Johnson | |
| 3,530,960 A | 9/1970 | Otto et al. | |
| 3,624,749 A | 11/1971 | Girard et al. | |
| 3,772,548 A | 11/1973 | Wroblewski | |
| 3,994,370 A | 11/1976 | Gebhardt et al. | |
| 4,026,393 A | 5/1977 | Gebhardt et al. | |
| 4,042,071 A | 8/1977 | Pöllinger | |
| 4,108,286 A | 8/1978 | Gagarin | |
| 4,110,647 A | 8/1978 | Eslinger et al. | |
| 4,152,099 A | 5/1979 | Bingler | |
| 4,281,745 A | 8/1981 | Wirth | |
| 4,792,020 A | 12/1988 | Okumura et al. | |
| 4,840,348 A | 1/1989 | Takigawa et al. | |
| 4,811,992 A | 3/1989 | Steiner | |
| 4,880,281 A | 11/1989 | Merkelbach | |
| 4,913,266 A | 4/1990 | Russell et al. | |
| 5,007,508 A | 4/1991 | Lacombe | |
| 5,190,124 A | 3/1993 | Haneda | |
| 5,261,511 A | 11/1993 | Libsch et al. | |
| 5,273,140 A | 12/1993 | Berwanger | |

(Continued)

FOREIGN PATENT DOCUMENTS

DE 10128072 12/2002
DE 10351592 B3 * 4/2005
(Continued)

OTHER PUBLICATIONS

International Search Report and Written Opinion for Application No. PCT/US2012/031647 dated Aug. 16, 2012 (16 pages).

*Primary Examiner* — Bradley T King
*Assistant Examiner* — Stephen M Bowes
(74) *Attorney, Agent, or Firm* — Michael Best & Friedrich LLP

(57) ABSTRACT

A brake hub assembly including a brake hub and a brake disk having a first brake surface, a second brake surface spaced axially from the first brake surface, and a plurality of ribs extending between the first and second brake surfaces. Where the brake hub is thermally isolated from the brake hub by various combinations of spacers, torque pins, torque lugs, and the like.

30 Claims, 49 Drawing Sheets

(56) References Cited

U.S. PATENT DOCUMENTS

| | | | |
|---|---|---|---|
| 5,344,219 A * | 9/1994 | Adrian et al. | 301/64.102 |
| 5,352,305 A | 10/1994 | Hester | |
| 5,435,420 A | 7/1995 | White | |
| 5,439,077 A | 8/1995 | Wirth | |
| 5,507,367 A | 4/1996 | Dagh et al. | |
| 5,540,303 A | 7/1996 | Bodin et al. | |
| 5,568,846 A | 10/1996 | Dagh et al. | |
| 5,664,648 A | 9/1997 | Hester | |
| 5,739,684 A | 4/1998 | Burns | |
| 5,851,056 A | 12/1998 | Hyde | |
| 5,988,324 A | 11/1999 | Bertetti et al. | |
| 5,988,613 A | 11/1999 | Dagh et al. | |
| 6,098,764 A | 8/2000 | Wirth et al. | |
| 6,116,386 A * | 9/2000 | Martin | 188/218 XL |
| 6,139,215 A | 10/2000 | Kühne et al. | |
| 6,145,632 A | 11/2000 | Rutter | |
| 6,161,661 A | 12/2000 | Pahle et al. | |
| 6,224,266 B1 | 5/2001 | Ohtsuki et al. | |
| 6,247,547 B1 | 6/2001 | Lemke et al. | |
| 6,257,678 B1 | 7/2001 | Brookey et al. | |
| 6,305,510 B1 | 10/2001 | Bunker | |
| 6,330,937 B1 | 12/2001 | Dagh et al. | |
| 6,364,426 B1 | 4/2002 | Home et al. | |
| 6,374,956 B1 | 4/2002 | Naeumann et al. | |
| 6,379,050 B1 | 4/2002 | Bertetti et al. | |
| 6,457,567 B1 | 10/2002 | Bunker | |
| 6,464,045 B2 | 10/2002 | Weber et al. | |
| 6,467,588 B1 | 10/2002 | Baumgartner et al. | |
| 6,543,858 B1 | 4/2003 | Melton | |
| 6,564,912 B1 | 5/2003 | Koschinat | |
| 6,564,913 B2 | 5/2003 | Baumgartner et al. | |
| 6,604,613 B2 | 8/2003 | Burgoon et al. | |
| 6,604,794 B1 | 8/2003 | Messina | |
| 6,612,657 B1 | 9/2003 | Fakhoury et al. | |
| 6,626,273 B1 | 9/2003 | Baumgartner et al. | |
| 6,702,398 B2 | 3/2004 | Laps | |
| 6,722,479 B2 | 4/2004 | Baumgartner et al. | |
| 6,742,233 B2 | 6/2004 | Wirth | |
| 6,829,825 B1 | 12/2004 | Bowman et al. | |
| 6,866,345 B2 | 3/2005 | Fakhoury et al. | |
| 6,880,682 B2 | 4/2005 | Gotti et al. | |
| 6,910,556 B1 | 6/2005 | Baumgartner et al. | |
| RE38,874 E | 11/2005 | Bieker et al. | |
| 6,962,242 B2 | 11/2005 | Conti | |
| 6,988,598 B2 * | 1/2006 | Williams | 188/218 XL |
| 7,028,816 B2 | 4/2006 | Baumgartner et al. | |
| 7,098,764 B2 | 8/2006 | Schaumburg et al. | |
| 7,104,368 B2 * | 9/2006 | Cornolti et al. | 188/218 XL |
| 7,111,911 B2 | 9/2006 | Baumgartner et al. | |
| 7,159,316 B2 | 1/2007 | Sadanowicz et al. | |
| 7,159,698 B2 | 1/2007 | Banks et al. | |
| 7,163,091 B2 | 1/2007 | Shamine et al. | |
| 7,228,946 B2 | 6/2007 | Baumgartner et al. | |
| 7,255,205 B2 | 8/2007 | Plantan et al. | |
| 7,261,192 B2 | 8/2007 | Khambekar et al. | |
| 7,281,769 B2 | 10/2007 | Pete et al. | |
| 7,374,024 B2 | 5/2008 | Iraschko | |
| 7,393,064 B2 | 7/2008 | Hall et al. | |
| 7,410,036 B2 | 8/2008 | Wimmer et al. | |
| 7,413,261 B2 | 8/2008 | De Freitas | |
| 7,506,940 B2 | 3/2009 | White | |
| 7,610,998 B2 | 11/2009 | Baumgartner et al. | |
| 7,780,243 B2 | 8/2010 | Lippis | |
| 7,866,447 B2 | 1/2011 | Baumgartner et al. | |
| 7,871,134 B2 | 1/2011 | Hofmann et al. | |
| 7,918,322 B2 | 4/2011 | Pahle | |
| 7,963,375 B2 | 6/2011 | Pahle | |
| 8,037,980 B2 | 10/2011 | Pahle | |
| 8,733,517 B2 * | 5/2014 | Tironi et al. | 188/218 XL |
| 2002/0157908 A1 | 10/2002 | Burgoon et al. | |
| 2004/0182660 A1 * | 9/2004 | Cavagna et al. | 188/218 XL |
| 2004/0195059 A1 | 10/2004 | Williams | |
| 2005/0206148 A1 | 9/2005 | Nechvatal et al. | |
| 2007/0062766 A1 | 3/2007 | Leinung et al. | |
| 2007/0175715 A1 | 8/2007 | Pahle | |
| 2007/0193837 A1 | 8/2007 | Lamb | |
| 2007/0215418 A1 | 9/2007 | Wirth et al. | |
| 2007/0246269 A1 | 10/2007 | Pahle et al. | |
| 2007/0286961 A1 | 12/2007 | Pahle et al. | |
| 2008/0060890 A1 | 3/2008 | Clark et al. | |
| 2008/0128229 A1 | 6/2008 | Pahle | |
| 2008/0135359 A1 | 6/2008 | Basirico et al. | |
| 2008/0149435 A1 | 6/2008 | Burgoon et al. | |
| 2008/0271965 A1 | 11/2008 | Reulein et al. | |
| 2008/0296965 A1 | 12/2008 | Hofmann et al. | |
| 2009/0020376 A1 | 1/2009 | Masoni et al. | |
| 2009/0038895 A1 | 2/2009 | Snyder et al. | |
| 2009/0218183 A1 | 9/2009 | Burgoon et al. | |
| 2010/0084911 A1 | 4/2010 | Ilg | |
| 2010/0101902 A1 | 4/2010 | Kano et al. | |
| 2010/0282547 A1 | 11/2010 | Fischer et al. | |
| 2010/0283276 A1 | 11/2010 | Wirth et al. | |
| 2010/0307875 A1 | 12/2010 | Ilg et al. | |

FOREIGN PATENT DOCUMENTS

| | | | |
|---|---|---|---|
| DE | 10257719 B4 * | 4/2007 | |
| DE | 10262070 B4 * | 8/2007 | |
| EP | 0127932 A1 | 12/1984 | |
| EP | 0418532 | 3/1991 | |
| EP | 0872659 A1 * | 10/1998 | F16D 65/00 |
| JP | 62209234 | 9/1987 | |
| WO | 0233280 | 4/2002 | |
| WO | 2009154548 A1 | 12/2009 | |
| WO | WO 2011015962 A1 * | 2/2011 | |

* cited by examiner

DISK BRAKE HUB ASSEMBLY

FIELD OF THE INVENTION

Exemplary embodiments of the present invention are generally related to disk brake hub assemblies. More particularly, in some exemplary embodiments, the present invention provides a disk brake hub assembly with improved thermodynamic isolation.

BACKGROUND

Commercial trucking companies are under enormous pressures to stay financially healthy and need to find new ways to increase the efficiency of their fleet. One way to increase fleet efficiency is to reduce the weight of the wheel hubs in the trucks by creating them from lightweight materials such as aluminum. The high cost of lightweight aluminum hubs relative to conventional cast iron hubs can be offset in a relatively short time by fuel savings and increased cargo capacity. The lightweight and ease of processing makes aluminum an attractive material in weight sensitive systems, but aluminum also has a few drawbacks, namely its ability to easily conduct heat, and the fact that it loses strength rapidly at temperatures over 350 degrees. Not all vehicles are suitable for aluminum wheel hubs, however, so it would also be useful to design a wheel hub composed of iron or other metals that avoids the thermal and strength problems of current disk brake hub assemblies.

Over 95 percent of the semi-tucks and trailers on the road in the United States use drum brake systems. Market and regulatory forces are driving an increase in demand for disk brake systems despite their past reputation as being heavier and more expensive than drum systems. Furthermore, disk brake systems encounter thermal problems. The disks or rotors are the heat sink for a vehicle's kinetic energy that is converted to thermal energy during the braking process. Truck rotors routinely reach temperatures of over 900 degrees and that can cause thermal distortion of the rotors and brake failure. The thermal induced distortion effects need to be considered when designing the rotor mount system.

Simply bolting a flat disk or rotor to a rigid hub exacerbates the rotor's thermal distortion. The mounting bolts constrain the inside diameter of the rotor while the outside diameter is free to grow as the rotor heats up. Having the bolts attached to only one friction face, as in some designs, magnifies the constrained rotor's tendency to distort into a cone shape as it heats up. Excessively coned rotors cause excess wear on the brake pads in addition to accelerating the formation and growth of fatigue cracks in the rotors.

SUMMARY

In some exemplary embodiments, the invention includes a disk brake hub assembly couplable to the axle of a vehicle, the disk brake hub assembly including a brake hub defining a central axis, a brake disk coupled to the brake hub, the brake disk having a first braking surface, a second braking surface spaced axially from the first brake surface, and at least one spacer between the hub and the brake disk, where the at least one spacer axially separates the brake hub from the brake disk.

In another exemplary embodiment, the invention includes a brake hub assembly couplable to the axle of a vehicle, the brake hub assembly including a brake hub composed of a first material and defining a central axis, a brake disk coupled to the brake hub, the brake disk having a first braking surface, and a second braking surface spaced axially from the first braking surface to produce a plurality of openings each defining an area, and where an intermediate member is in contact with an axial surface of the brake disk, and where the intermediate member is composed of a second material having a thermal conductivity less than the first material. The intermediate member may have an inboard end defining a plane that is parallel to at least one of the first and second braking surfaces, and wherein at least some of the area of the opening is inboard of the plane.

In still another exemplary embodiment, the invention includes a brake hub assembly couplable to the axle of a vehicle, the brake hub assembly including a brake hub defining a central axis, a brake disk having a first braking surface, and a second braking surface spaced axially from the first braking surface, and where the brake disk defines a plurality of radially extending slots. The brake hub assembly also includes a torque member extending between the brake disk and the brake hub to transmit torque therebetween, where the torque member is at least partially received within and moveable along a slot of the brake disk.

The brake hub assembly may also include an axial preload spring having a plurality of base portions each coupled to a corresponding torque member, and wherein the axial preload spring is configured to bias the brake disk towards the outboard end of the hub.

In still another exemplary embodiment, the invention includes a brake hub assembly couplable to the axle of a vehicle, the brake hub assembly including a hub defining a central axis, the hub having a first set of lugs and a second set of lugs axially spaced from the first set of lugs, a wheel flange plate removeably coupled to the first set of lugs, and a brake disk removeably coupled to the second set of lugs. The wheel flange and the brake disk can be removed from the hub without removing the hub from the axle.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Exemplary embodiments of the present invention provide systems and methods for providing a disk brake hub assembly with improved thermodynamic isolation. In some exemplary embodiments, the systems and methods include torque members, spacers, and various other improvements to minimize the amount of heat transferred from the brake disk to the brake hub. Furthermore, some embodiments of the hub assembly utilize lightweight materials, such as aluminum, to minimize rotating mass and increase efficiency.

Figure 1:
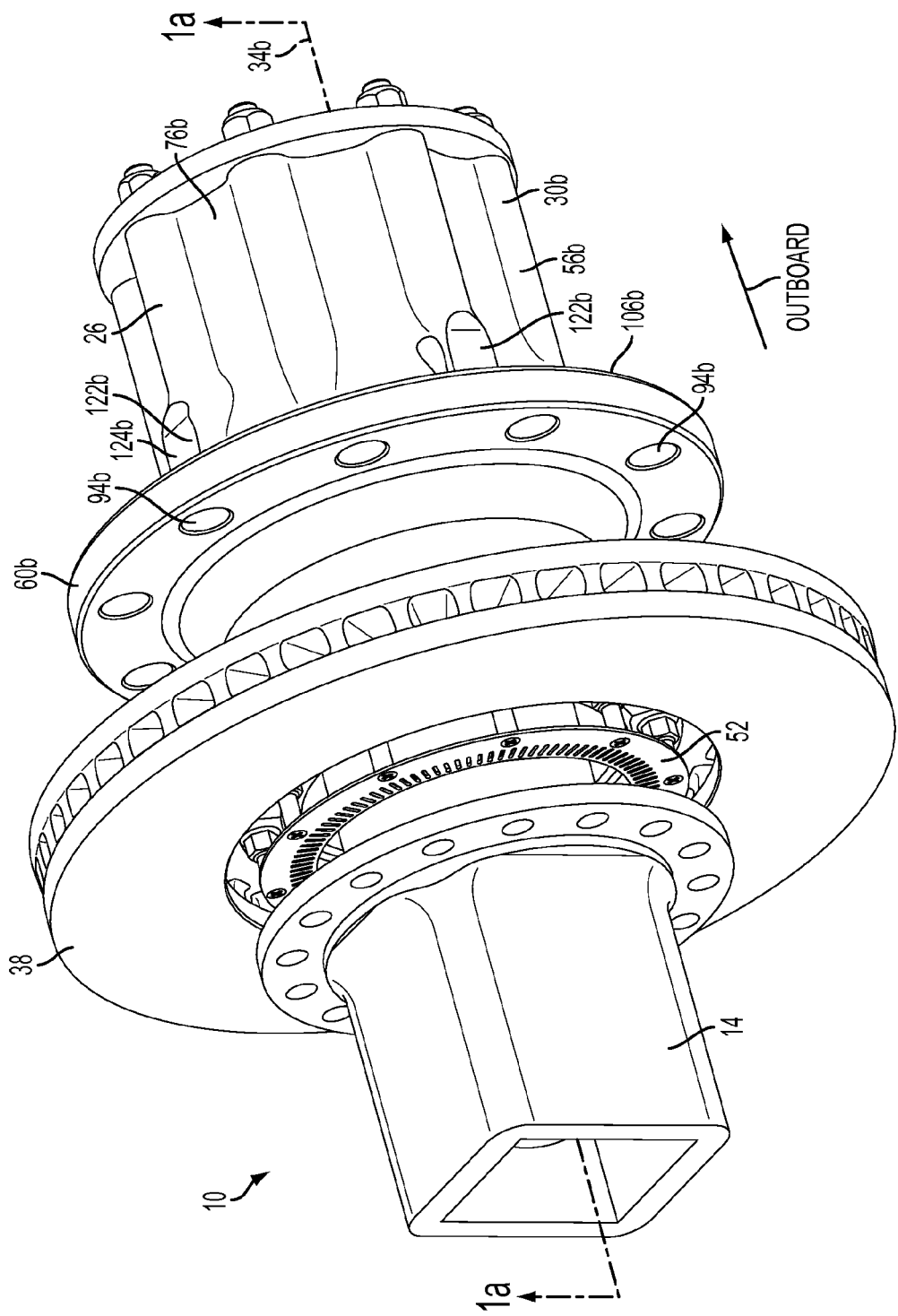
FIG. 1 illustrates a brake hub assembly installed on the suspension of a motor vehicle.
Figure 1A:
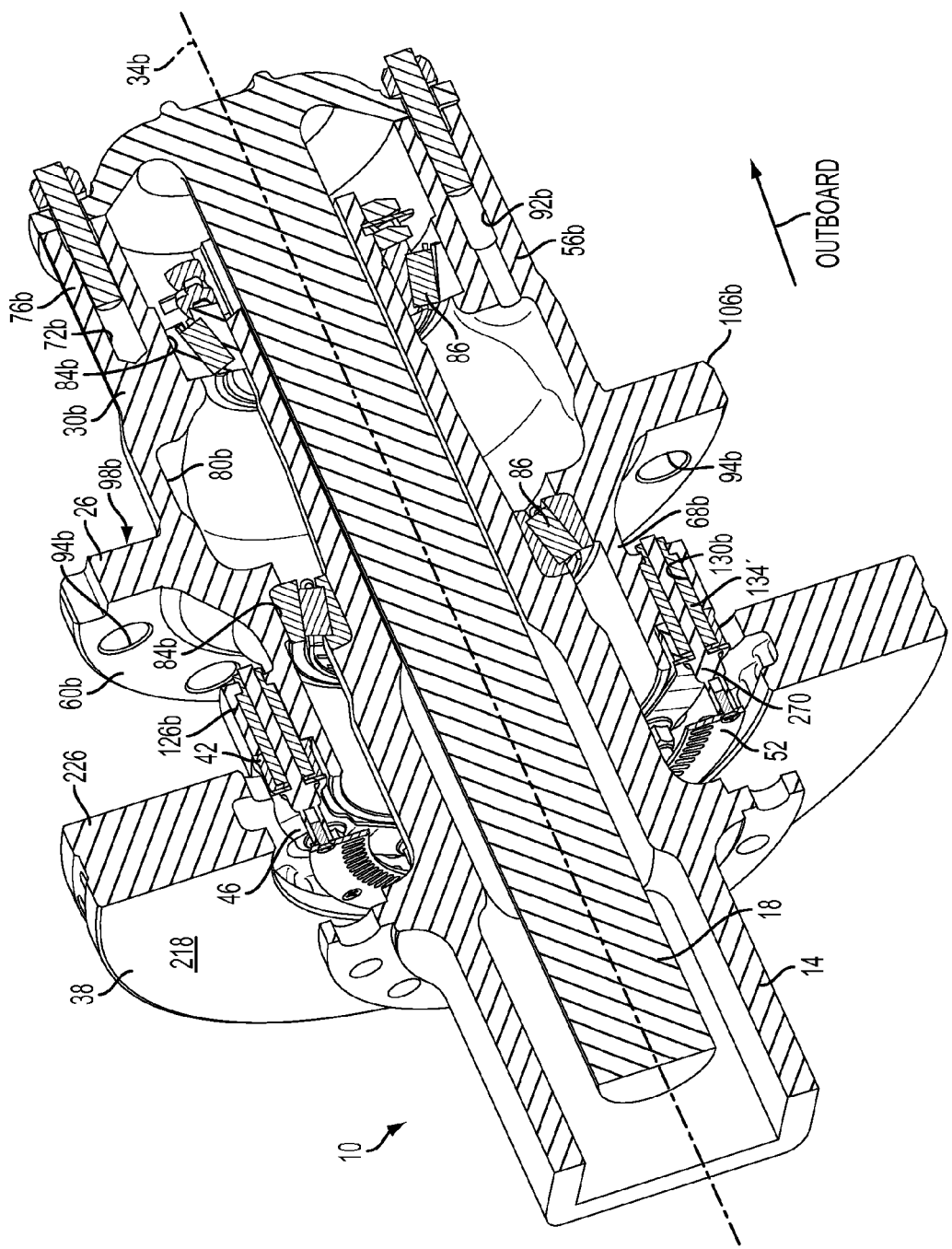
FIG. 1a is a section view taken along lines 1a-1a of FIG. 1.
Figure 2:
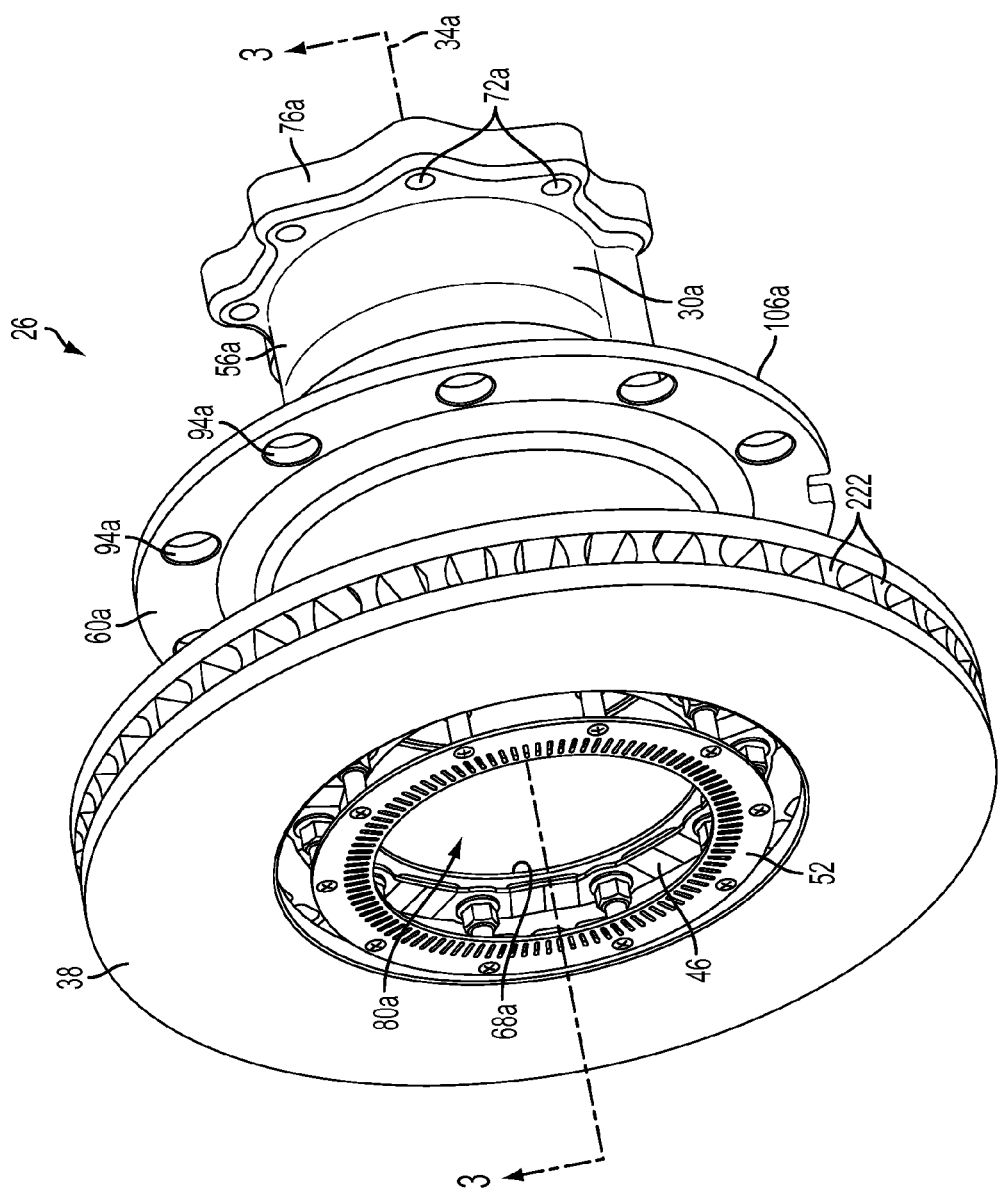
FIG. 2 is a perspective view of an embodiment of a brake hub assembly.

FIGS. 1 and 1a illustrate a motor vehicle 10, such as a car, truck, van, or the like having a suspension assembly 14 that includes an axle 18, a brake caliper (not shown), and a disk brake hub assembly 26 rotateably mounted on the axle 18 and in mechanical communication with the caliper. During operation of the vehicle 10, one or more wheels (not shown) are typically mounted on and supported by the hub assembly 26 for rotation about an axis.

FIGS. 1-31 illustrate various embodiments of the disk brake hub assembly 26 with improved thermodynamic isolation. In general, each assembly 26 includes a hub 30a, 30b, 30c, 30d defining a central axis, a brake disk 38 coupled to the hub via a plurality of torque members 42, an axial preload spring 46, and a tone ring 52. During operation of the vehicle, the wheel and hub assembly 26 rotate as a single unit about the central axis.

During operation, the user is able to control or otherwise limit the rotation of the hub assembly 26 and wheel with respect to the axle 18 by actuating the brake caliper. More specifically, when the user actuates the caliper (e.g., by pressing the brake pedal), the caliper engages the brake disk 38 of the hub assembly 26, creating friction that acts against the rotation of the hub. The friction also creates large amounts of heat, which in turn causes the brake disk 38 to rise in temperature, sometimes in excess of 900 degrees. Since the hub typically contains thermally sensitive elements, such as bearings, seals, and the like, it is important that the brake disk 38 be thermally isolated from the hub to limit the amount of heat that is transferred between them. This is especially important in brake hub assemblies where the hub is formed from aluminum alloys or other highly thermally conductive materials, since the heat will more easily be conducted to the sensitive elements of the assembly 26 and cause damage. In addition to potentially damaging the sensitive elements of the hub, excessive heat from the brake disk 38 can also compromise the integrity of the hub itself, since aluminum begins to weaken when heated above 350 degrees Fahrenheit.

Furthermore, the varying thermal loads experienced by the brake disk 38 in each braking cycle cause the disk 38 to thermally expand and contract. Since the hub is separately constructed from the disk 38, the disk 38 experiences a much wider range of temperatures compared to the hub. Given the differences in temperature variation and thermodynamic properties, the brake disk 38 will actually expand and shrink relative to the hub. The present assembly enables the brake disk 38 to "float" with respect to the hub, both axially and radially, limiting the stresses produced during the braking cycle while still allowing the braking torque to be transferred between the two elements.

A first hub embodiment 30a of the hub assembly 26 is shown in FIGS. 2-5. The hub 30a is formed (e.g., cast) of austempered ductile iron for strength and durability. In the illustrated construction, the hub 30a includes a substantially cylindrical body 56a, a wheel flange 60a extending generally radially from the body 56a at about the axial center of the hub 30a, and a plurality of torque members 42, which in this embodiment are torque lugs 64a, proximate the inboard end 68a of hub 30a. The hub also includes a set of threaded apertures 72a proximate the outboard end 76a of the hub 30a to which the axle 18 may be attached.

Figure 3:
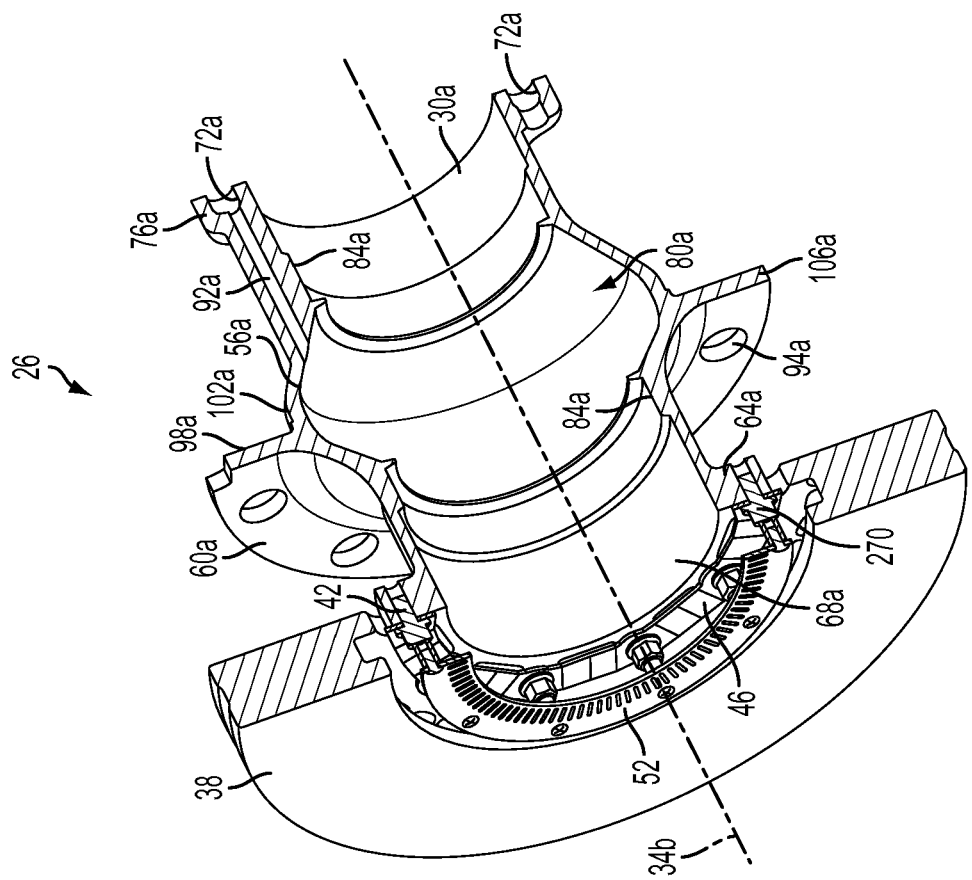
FIG. 3 is a section view taken along lines 3-3 of FIG. 2.

As best shown in FIG. 3, the body 56a of the hub 30a defines an interior recess 80a, extending co-axially with the central axis 34a through the body 56a. The recess 80a includes one or more (e.g., two) bearing seats 84a, each sized to receive a respective bearing 86 (see FIG. 1a) of the bearing assembly, and may include one or more seal seats each sized to receive a respective seal, or one or more locking channels each sized to receive a locking ring. In the illustrated construction, the body 56a also includes a lube channel 92a, extending between one of the threaded apertures 72a and the recess 80a to monitor and maintain the fluid levels within the hub 30a.

The wheel flange 60a defines a plurality wheel stud apertures 94a, each configured to receive a wheel stud (not shown) for securing the wheel to the hub 30a. The number and position of the apertures 94a generally correspond to the bolt pattern of the respective wheel. Furthermore, the mounting surface 98a of the wheel flange 60a is generally machined or finished to assure that the surface 98a is accurately aligned with the axis 34a of the hub 30a, so that the wheel is properly positioned during use. The hub 30a also includes a wheel pilot surface 102a, extending axially from the radially inward edge of the flange 60a to assure the wheel is co-axial with the central axis 34a.

Figure 5:
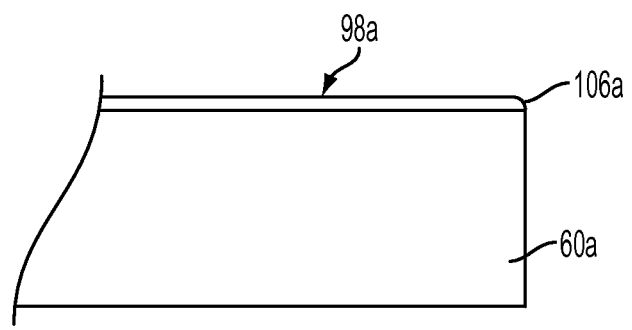
FIG. 5. is a detailed view of the wheel mount flange of the brake hub assembly of FIG. 2.

Illustrated in FIG. 5, the outboard edge 106a of the wheel flange 60a may be radiused, or curved to substantially conform to the deflection of the wheel's rim under side load. Ideally, the curve of the outboard edge 106a substantially matches the natural deflection of the rim to reduce residual stress within the rim and minimize the tendency of the rim to crack after exposure to repeated side loads. In the present invention, the shape of the outer edge causes the point of contact between the hub and the wheel rim to move, albeit slightly, to help distribute the stress load over a larger area. More specifically, the outboard edge includes a smooth transition from the planar wheel mounting surface to a cubic curve that substantially conforms to the deflection of the wheel's disk face when under load. The cubic curve then smoothly transitions into different, sharper curve where the wheel deflection curve is at two times the hub's max rated load. In alternate constructions the curve may include any combination of elliptical, parabolic, linear or circular curves may be utilized for the edge.

Figure 4:
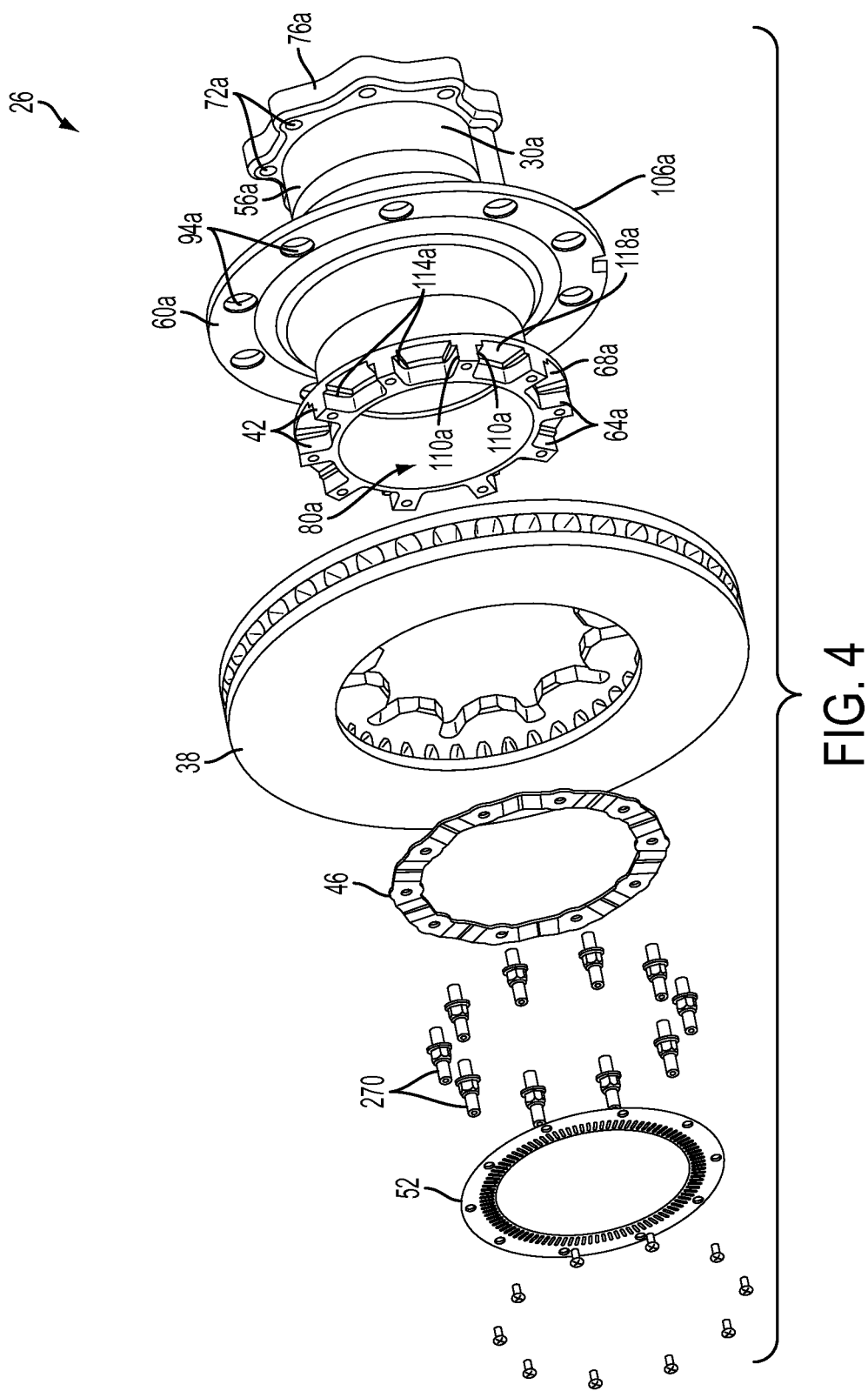
FIG. 4 is an assembly view of the brake hub assembly of FIG. 2.
Figure 4A:
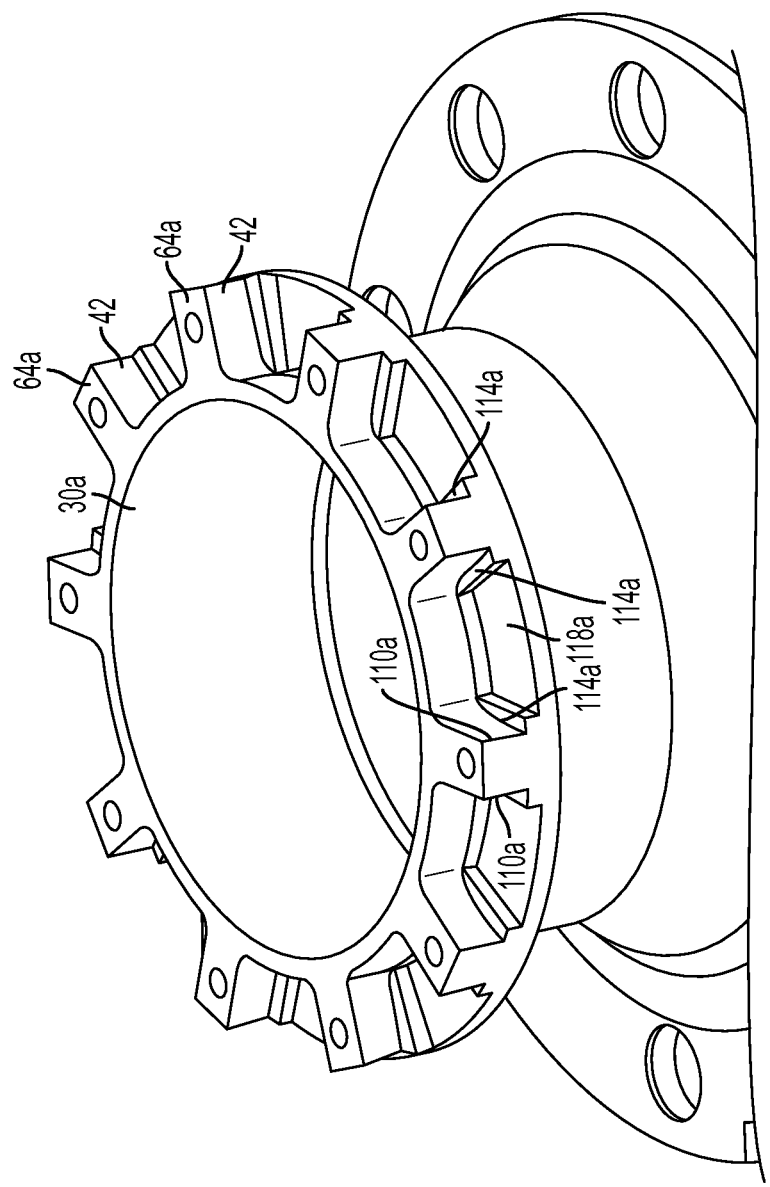
FIG. 4a is a detailed view of the torque members of the brake hub assembly of FIG. 2.

The first hub embodiment 30a also includes a plurality of (e.g., ten) torque lugs 64a, each formed integrally with the body 56a and extending radially outwardly proximate the inboard end 68a. Each torque lug 64a of the first hub embodiment 30a is substantially rectangular in shape, having a pair of flat, substantially parallel side walls 110a and sized to fit within and move along a corresponding radial slot 254 formed by the brake disk 38 (described below). Each torque lug 64a also includes a support ledge 114a extending along the side walls 110a on which the second braking surface 226 of the brake disk 38 rests when installed (see FIG. 4a). The ledges 114a are sized to space the brake disk 38 a distance from the webbing 118a extending between each pair of torque lugs 64a while also creating a gap therebetween. Ultimately, the ledges 114a minimize the amount of contact area between the brake disk 38 and the hub 30a as well as produce a gap for air to circulate.

FIGS. 6-9 illustrate a second hub embodiment 30b of the hub assembly 26 formed (e.g., cast) from an aluminum alloy to produce a low rotational mass. In the second hub embodiment 30b, the hub employs much of the same structure and has many of the same properties as the previously-described hub 30a shown in FIGS. 2-5. Analogous elements to those of the first embodiment have been given the same number and a reference letter "b". The following description of the hub 30b focuses primarily upon structure and features different than the previously-described construction.

Figure 6:
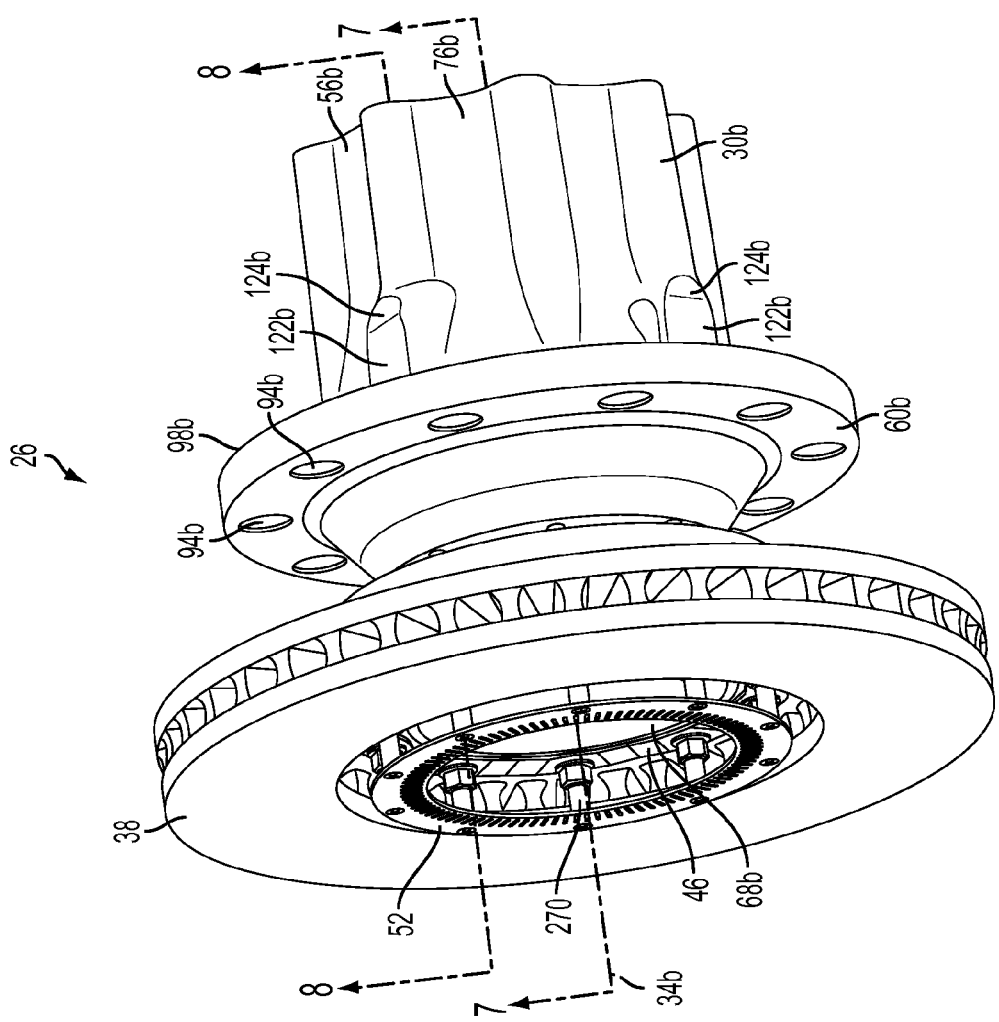
FIG. 6 is a perspective view of another embodiment of the brake hub assembly.
Figure 7:
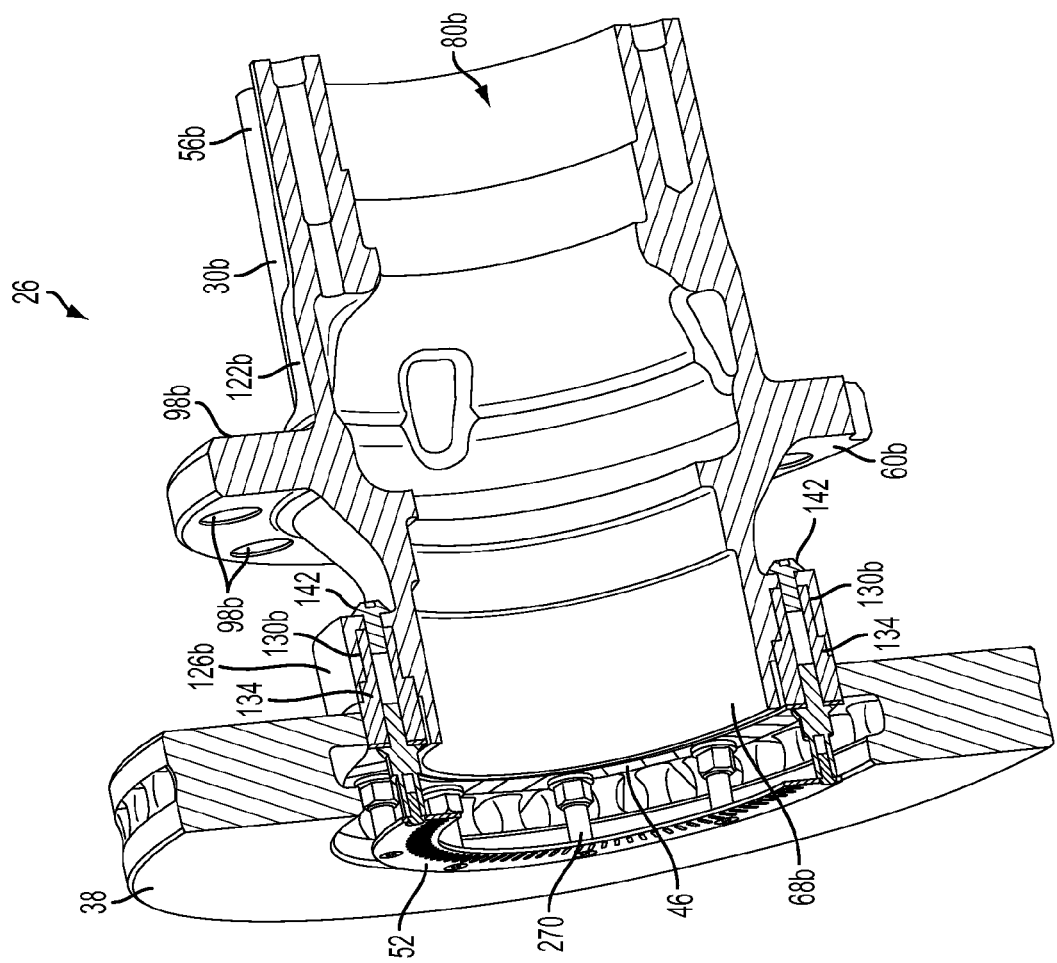
FIG. 7 is a section view taken along lines 7-7 of FIG. 6.
Figure 8:
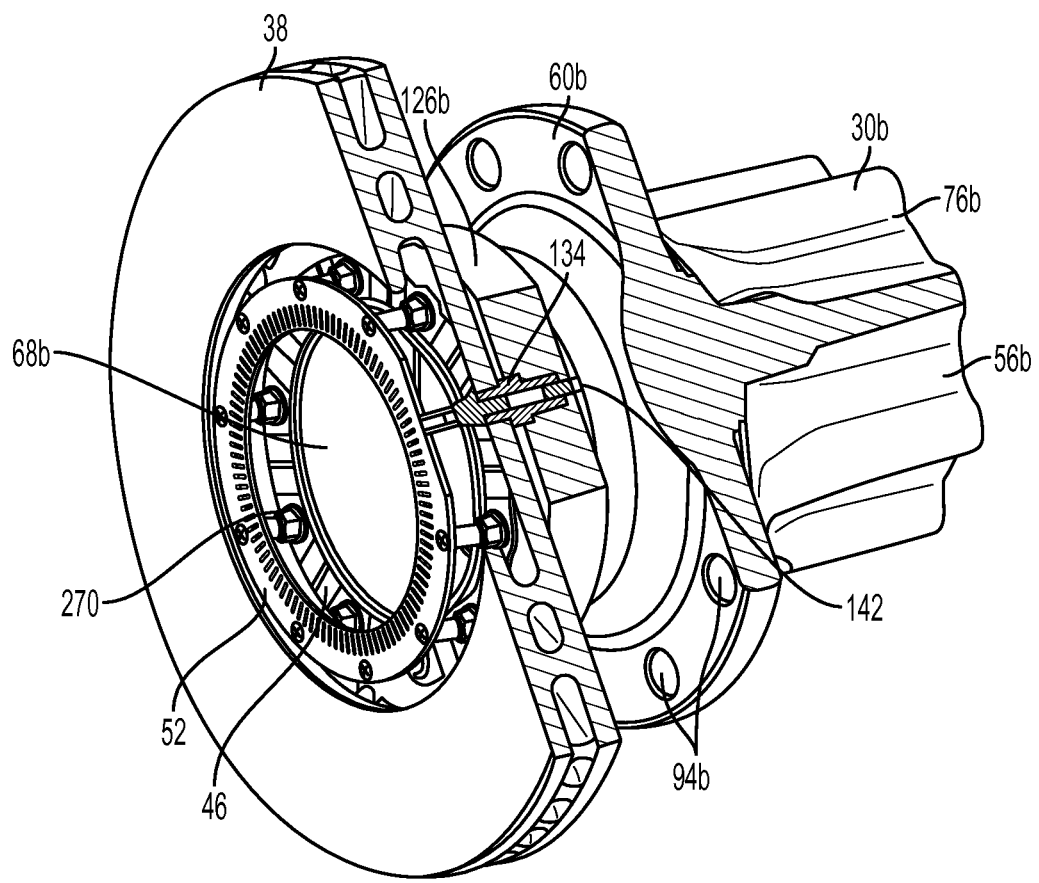
FIG. 8 is a section view taken along lines 8-8 of FIG. 6.
Figure 9:
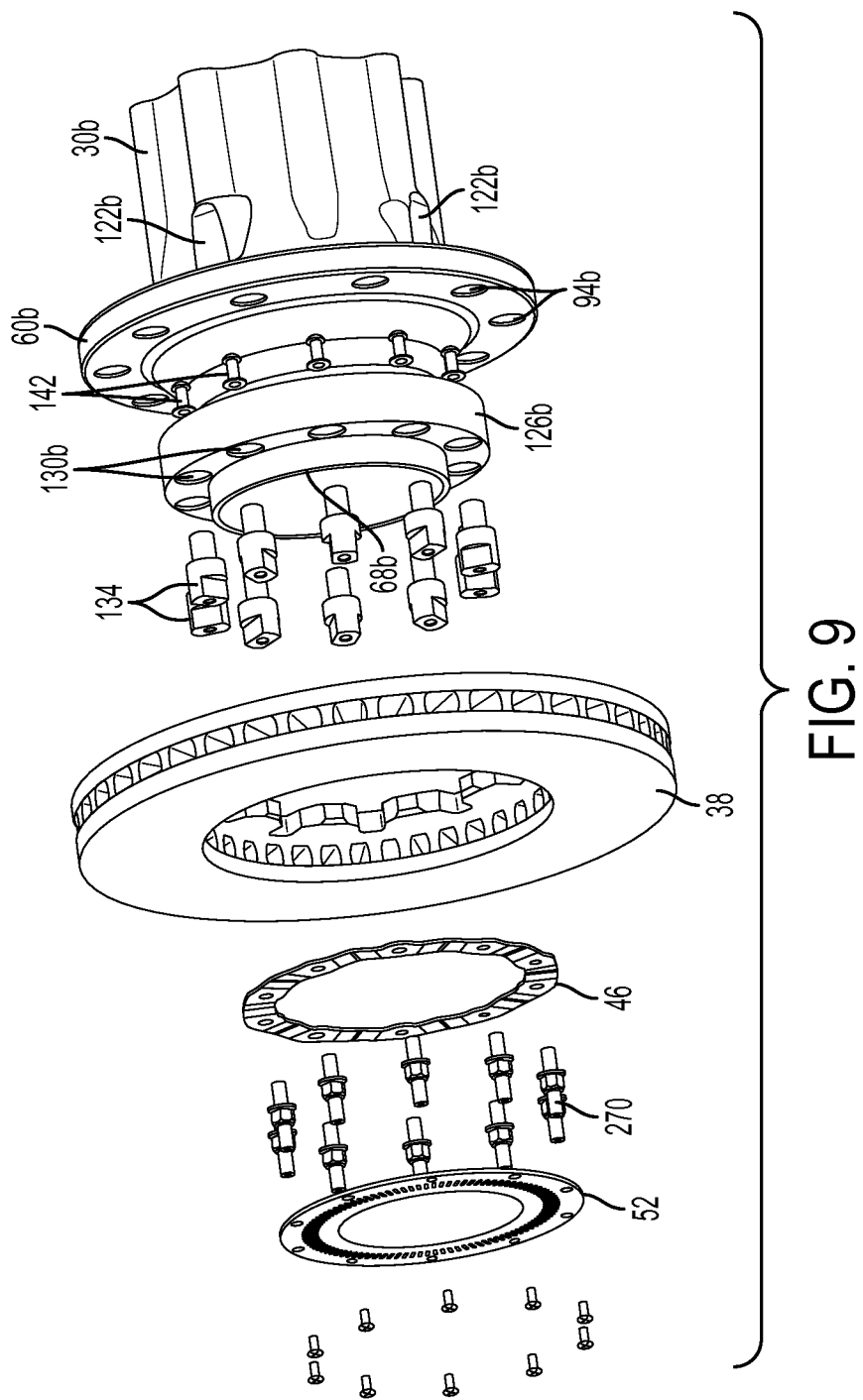
FIG. 9 is an assembly view of the brake hub assembly of FIG. 6.
Figure 10:
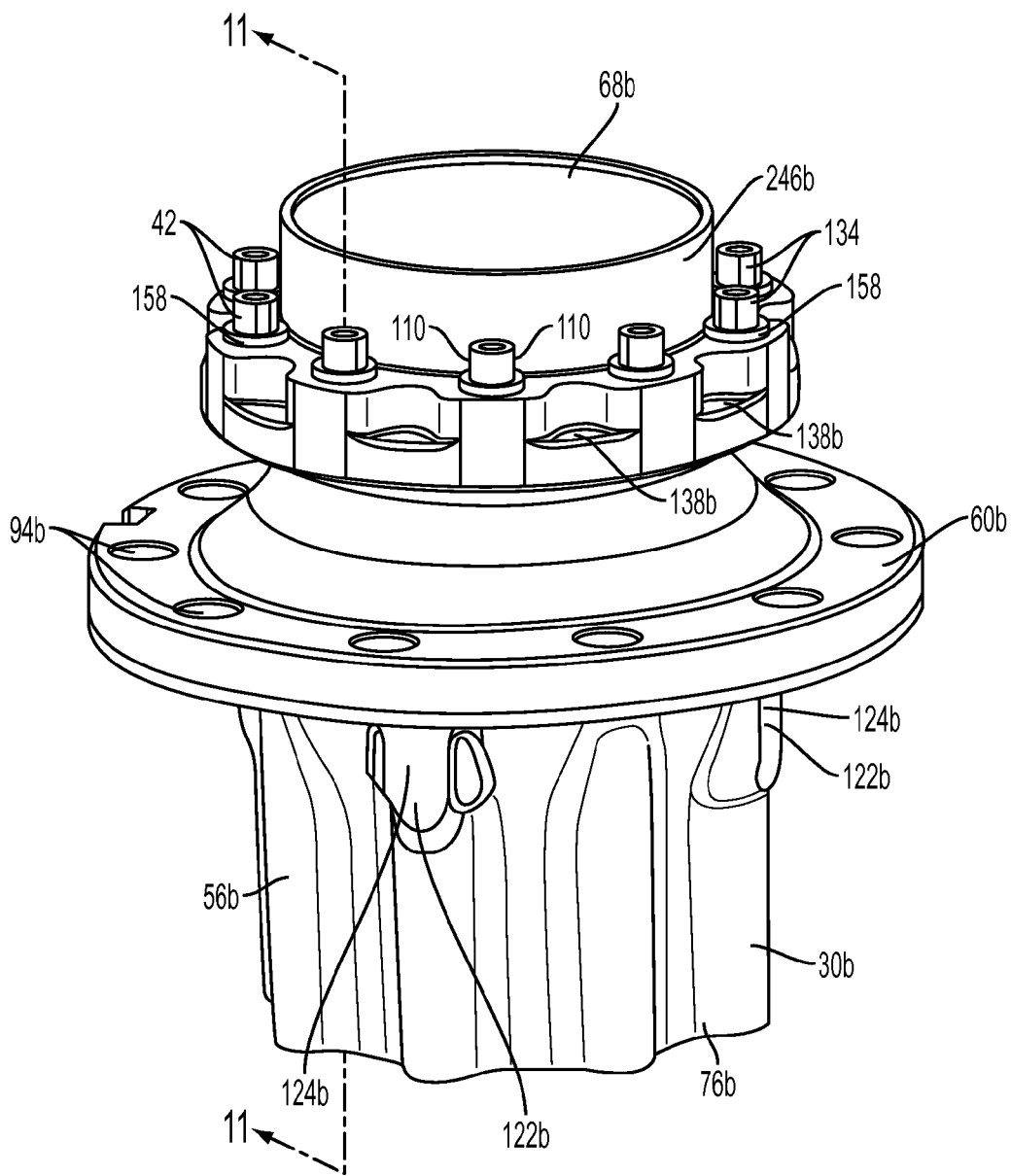
FIG. 10 is a perspective view of the brake hub assembly of FIG. 6 with the brake disk removed and notches added.
Figure 12:
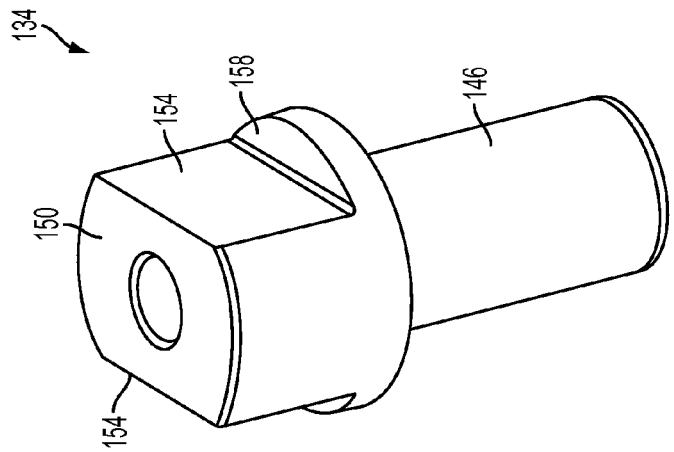
FIG. 12 is a perspective view of a torque pin of the brake hub assembly of FIG. 6.

Best illustrated in FIG. 6, the hub 30b includes a plurality of wheel pilots 122b, positioned on the outer surface of the hub body 56b. The wheel pilots 122b are generally positioned axially adjacent and outboard from the mounting surface 98b of the wheel flange 60b and are spaced equally along the circumference of the hub 30b. During use, the wheel pilots 122b center the wheel with the axis of rotation 34b. In the illustrated construction, each wheel pilot 122b includes a machined pad 124b extending from the hub body 56b. However, in alternate constructions, the wheel pilots 122b may be formed separately and subsequently installed on the hub 30b.

The second hub embodiment 30b also includes a mounting flange 126b extending radially outwardly from the body 56b proximate the inboard end 68b of the hub body 56b. The mounting flange 126b defines a plurality of apertures 130b, each of which are sized to receive a corresponding torque pin 134 (described below). In the illustrated construction, the mounting flange 126b is substantially cylindrical in shape (see FIG. 9), however in alternate constructions, the mounting flange 126b may include one or more recesses or notches 138b (see FIG. 10) to allow additional spacing from the brake disk 38 and promote airflow. In still other constructions, spacing pads (not shown) may be integrally formed on the mounting flange 126b to minimize the contact area between the hub 30b and the disk 38.

Figure 11:
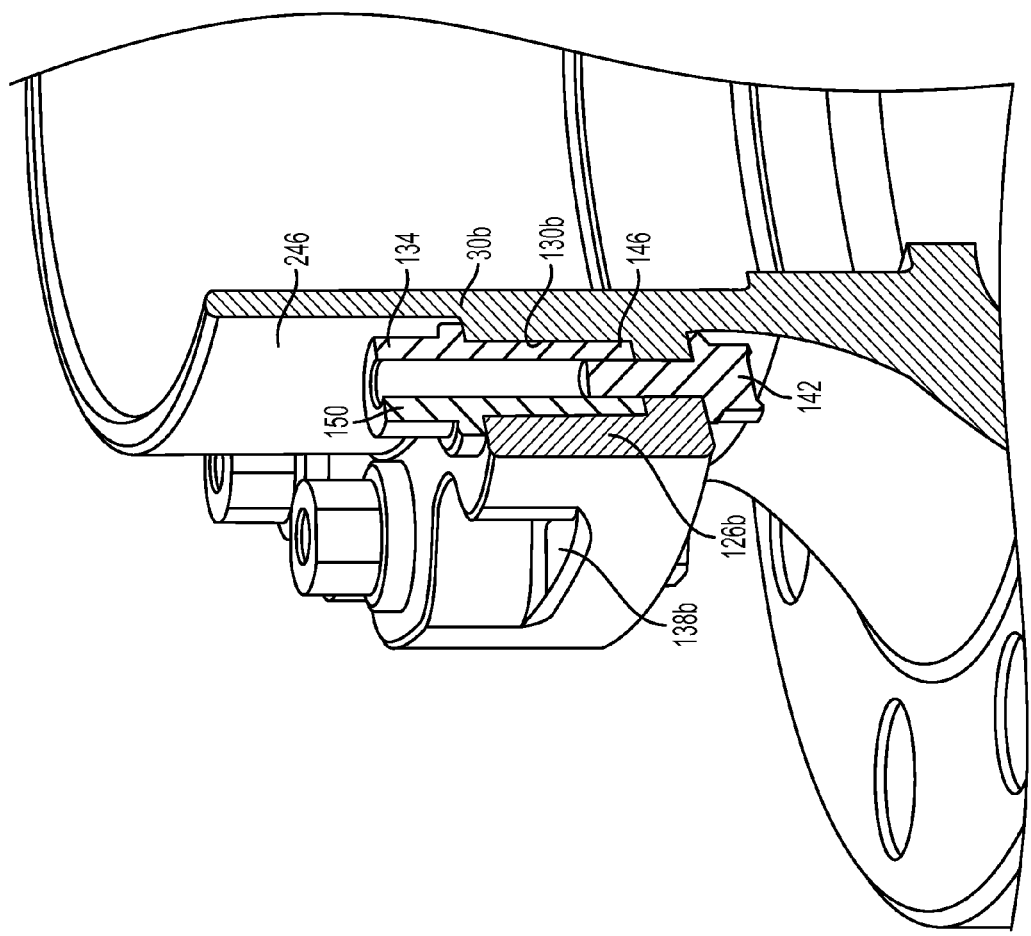
FIG. 11 is a section view taken along line 11-11 of FIG. 10.
Figure 13:
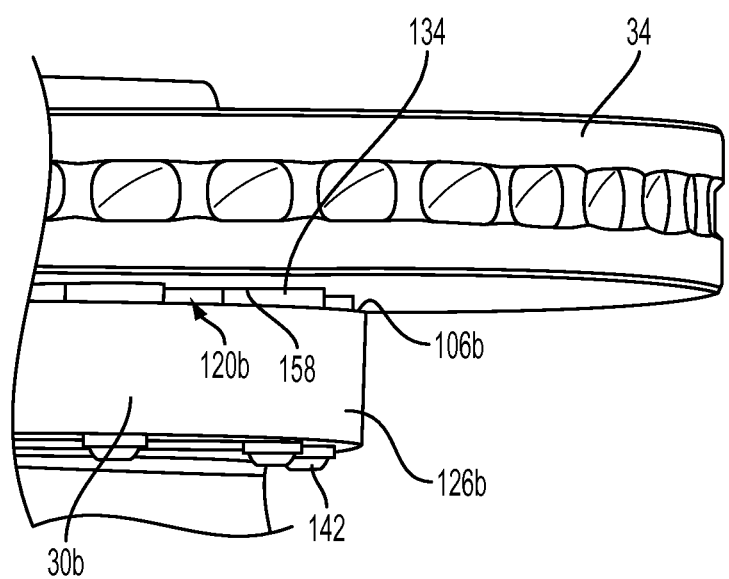
FIG. 13 is a detailed view of a brake disk installed on the brake hub assembly of FIG. 6.

The second embodiment of the hub 30b also includes a plurality of torque members 42 comprised of torque pins 134, each press fit into an aperture 130b of the mounting flange 126b and secured by a fastener 142 (see FIG. 11). In the illustrated construction, each torque pin 134 is formed from cylindrical metal (e.g., steel, stainless steel, and the like) and includes a shank 146 sized to be received within an aperture 130b of the mounting flange 126b, and a head 150 engageable with the brake disk 38 (see FIG. 12). In the illustrated construction, the torque pins 134 are composed of a material having a thermal conductivity that is lower (e.g., between about 2% and about 25%) than that material of the hub.

The head 150 of the torque pin 134 generally includes a pair of substantially parallel side walls or flats 154. The side walls 154 are cut into the head 150 so the circumferential contact area between the pin 134 and the brake disk 38 is large enough to produce contact stresses below the yield point of the brake disk and pin materials. If the circumferential contact area is too small, deformation of the brake disk and pin may occur.

Figure 14:
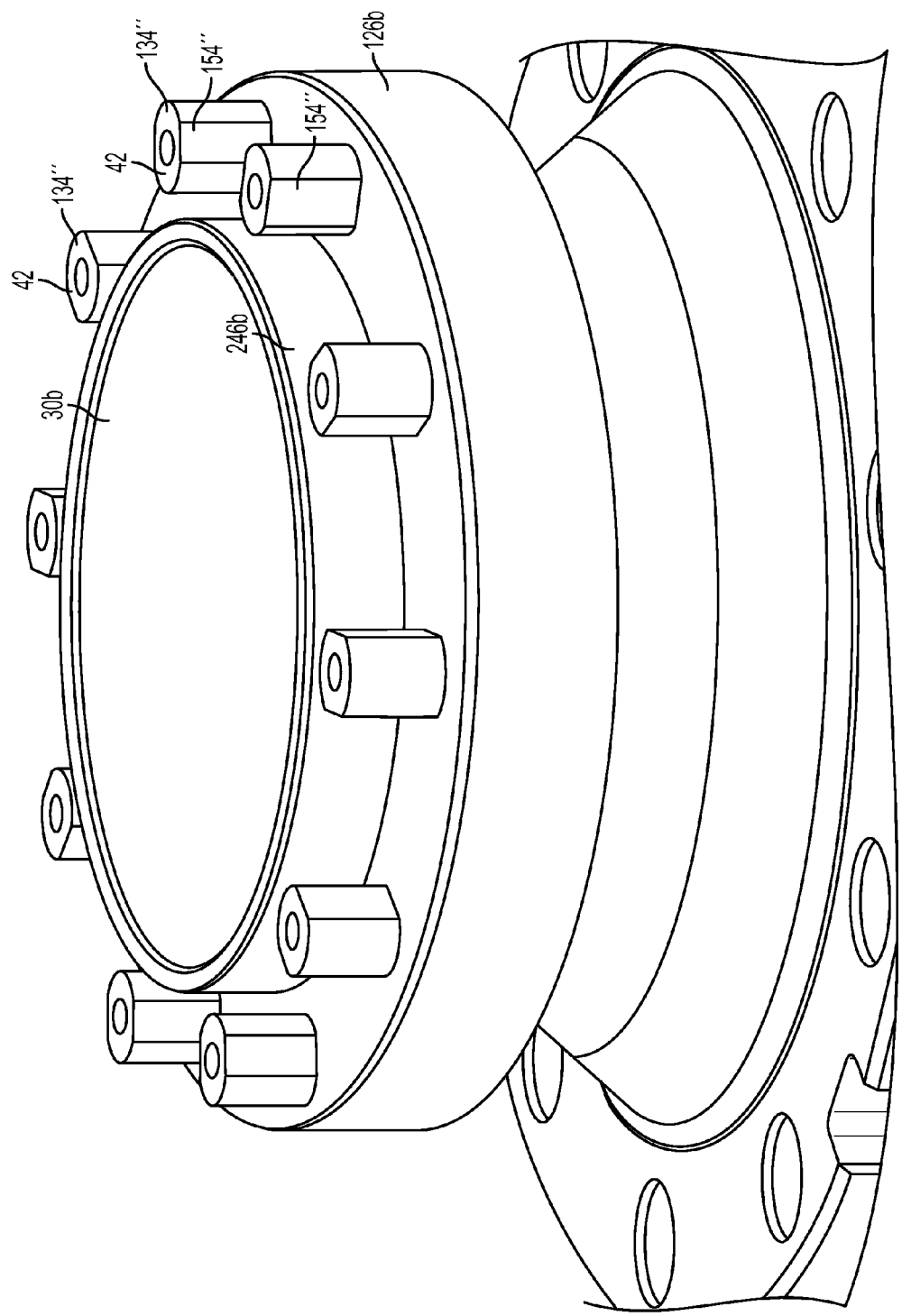
FIG. 14 is a perspective view of a spacerless torque pin installed on the brake hub assembly of FIG. 6.
Figure 14A:
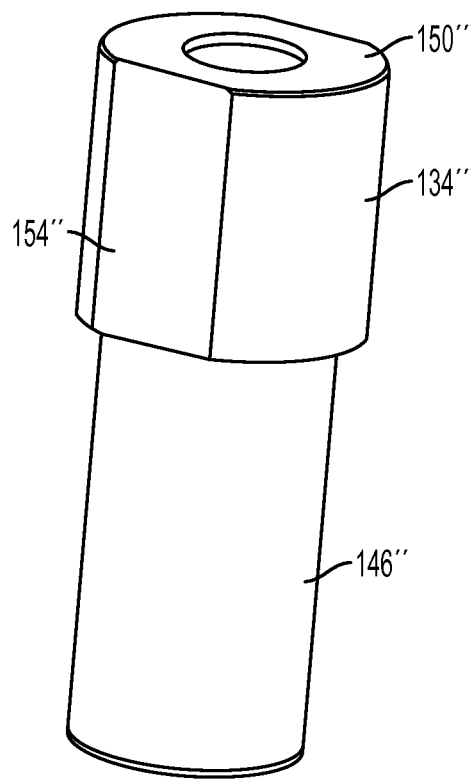
FIG. 14a is a perspective view of a spacerless torque pin.
Figure 15:
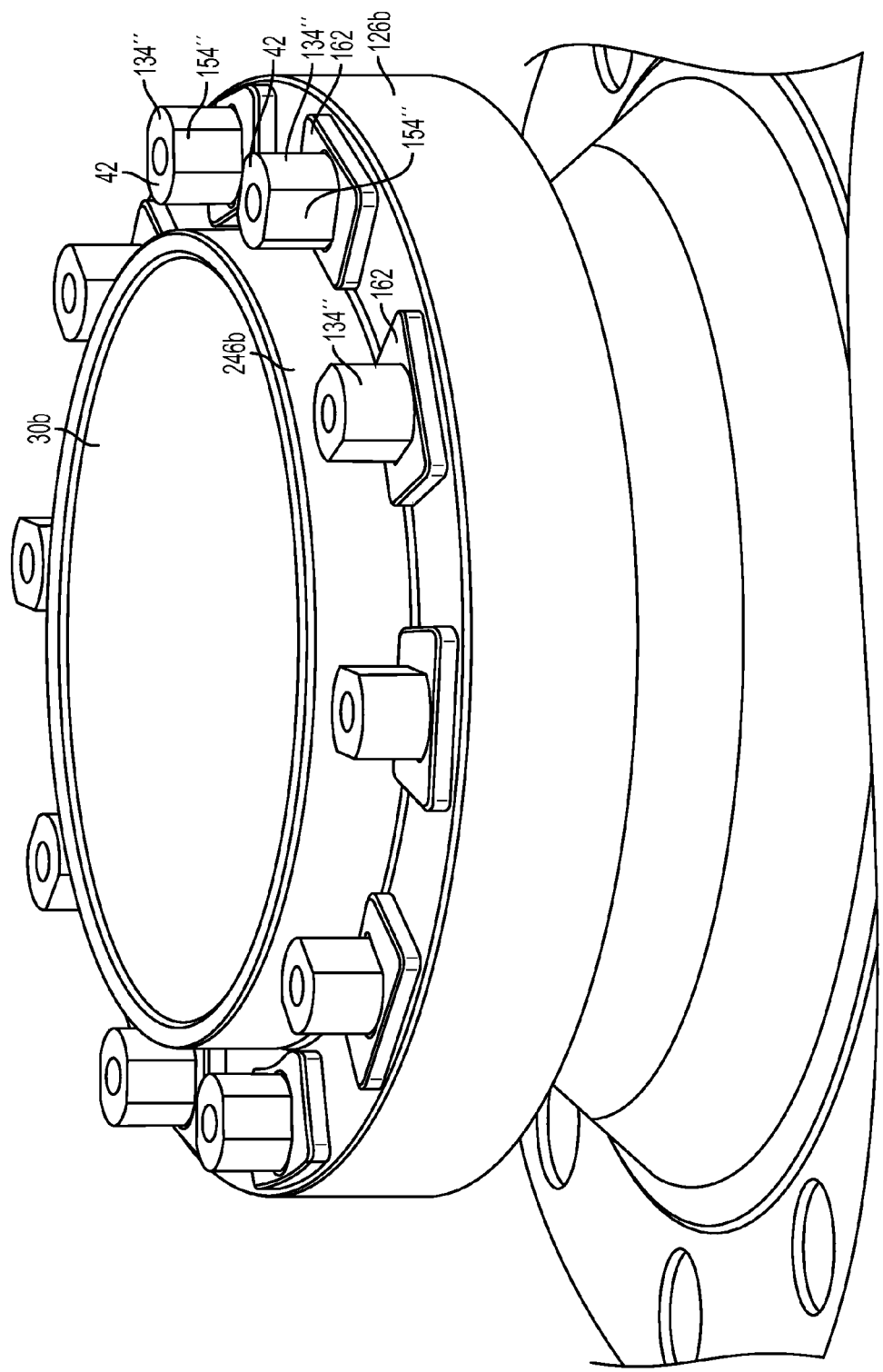
FIG. 15 is a detailed view of a spacerless torque pin mounted to the wheel hub assembly of FIG. 6 with a separate spacer.

In some constructions (see FIGS. 12 and 13), each torque pin 134 may also include an integral spacer 158 between the shank 146 and the head 150 to space the brake disk 38 a distance equal to the thickness of the spacer from the hub 30b (e.g., form a gap 120b) and minimize the contact area between the hub 30b and the disk 38. The spacer 158 also minimizes the amount of wear experienced by the softer, aluminum hub. However, in other constructions, no spacer may be present on the torque pin 134" (see FIGS. 14 and 14a). In still other constructions, a spacerless torque pin 134" may be used in conjunction with a separate spacer 162 (see FIG. 15). In still other constructions, the spacer 162 may be formed of one or more stacked sheets of high thermal resistance or wear resistant material such as a ceramic spacer sandwiched between two thin steel layers (not shown).

Figure 16A:
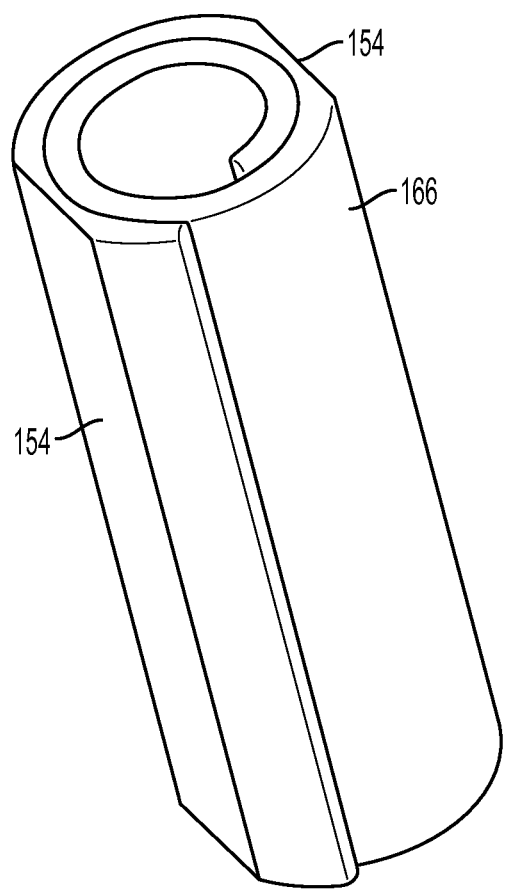
FIG. 16a illustrates a cylindrical coil spring.
Figure 16C:
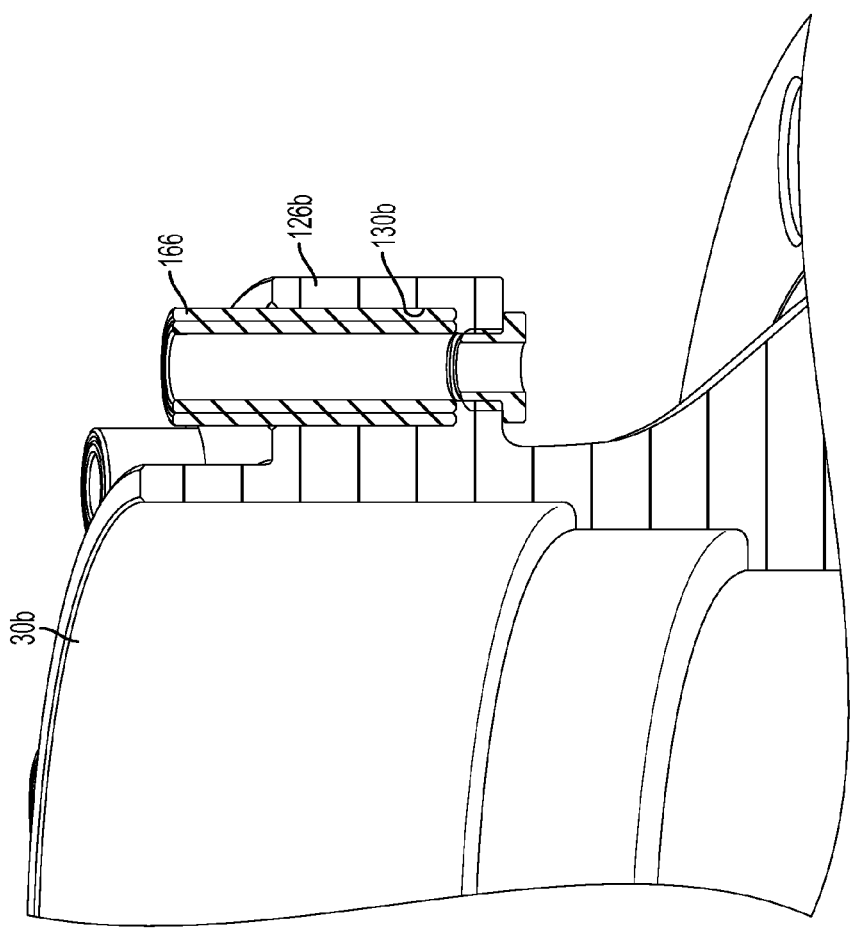
FIG. 16c is a section view taken along line 16c-16c of FIG. 16b.
Figure 16B:
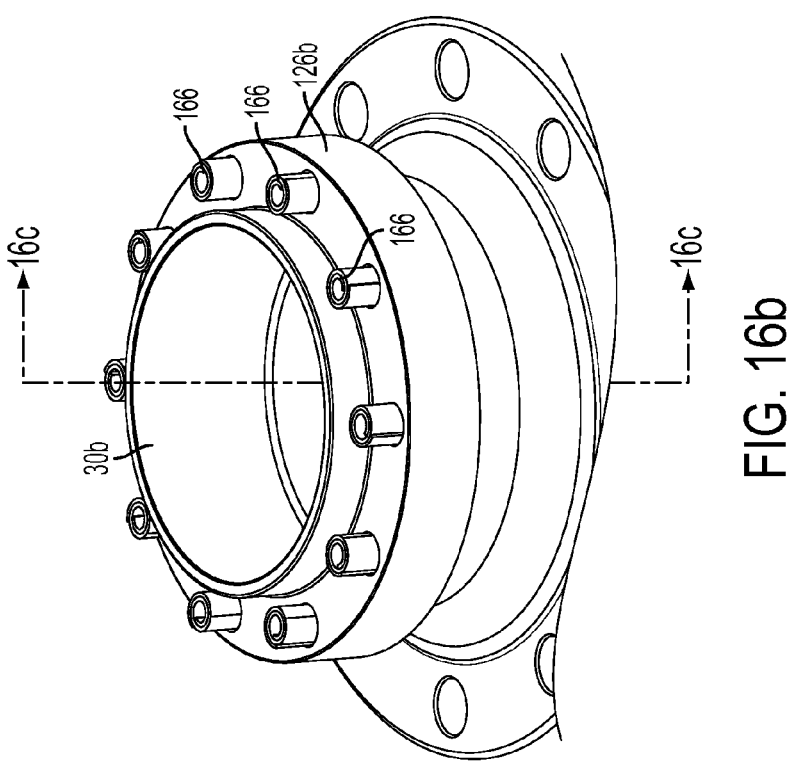
FIG. 16b illustrates a cylindrical coil spring installed on a brake hub.
Figure 17:
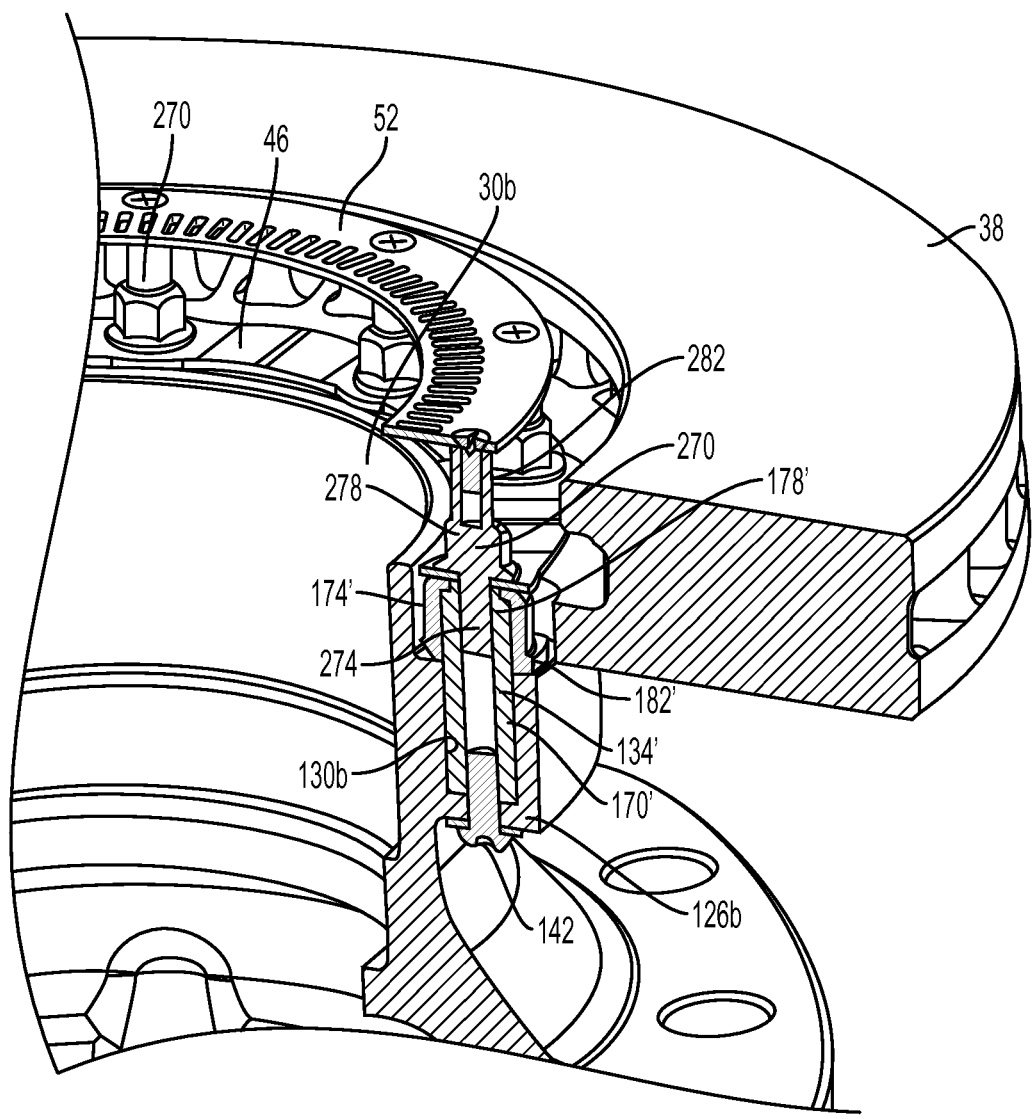
FIGS. 17-19 illustrate multiple forms of installing a multi-piece torque pin on a brake hub.
Figure 18:
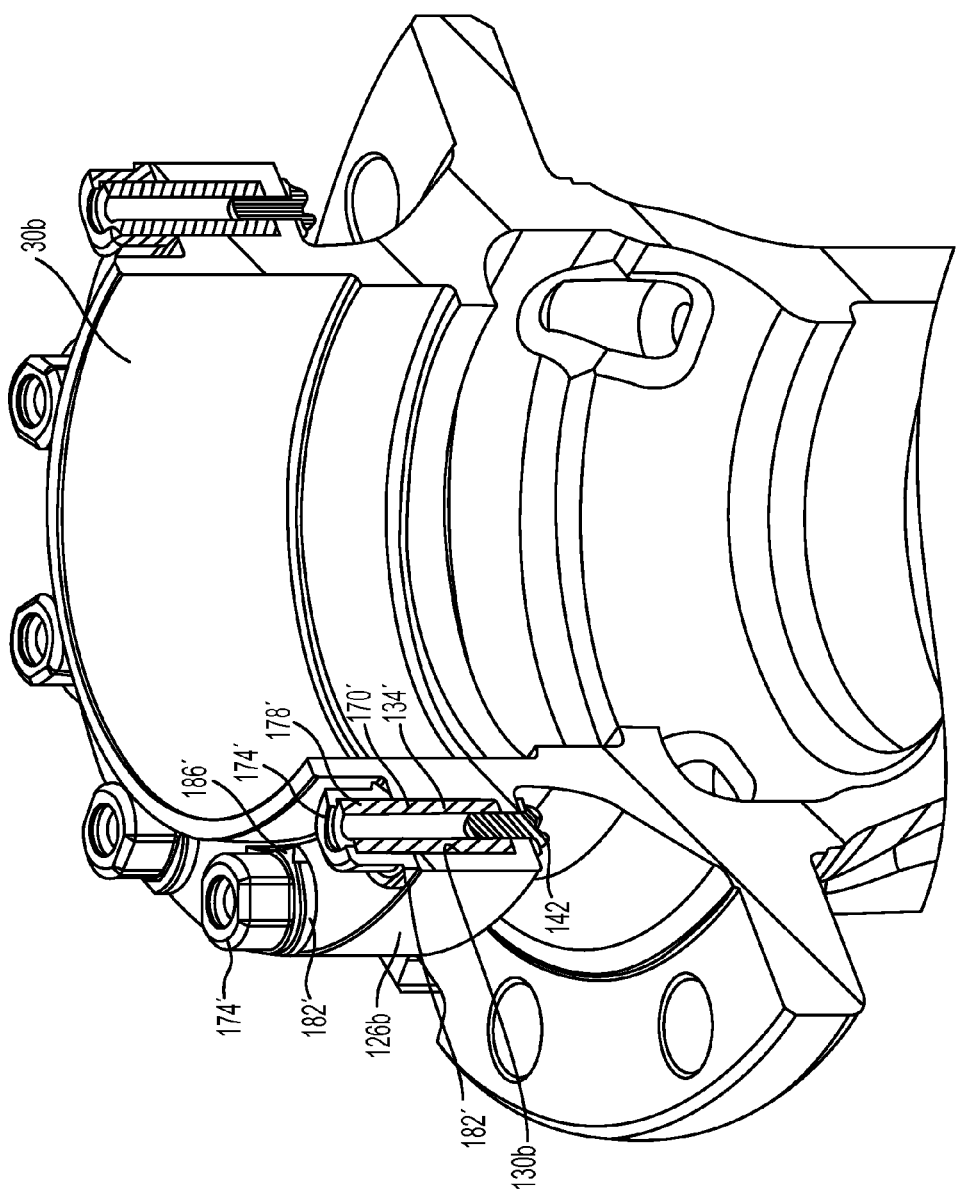
Figure 19:
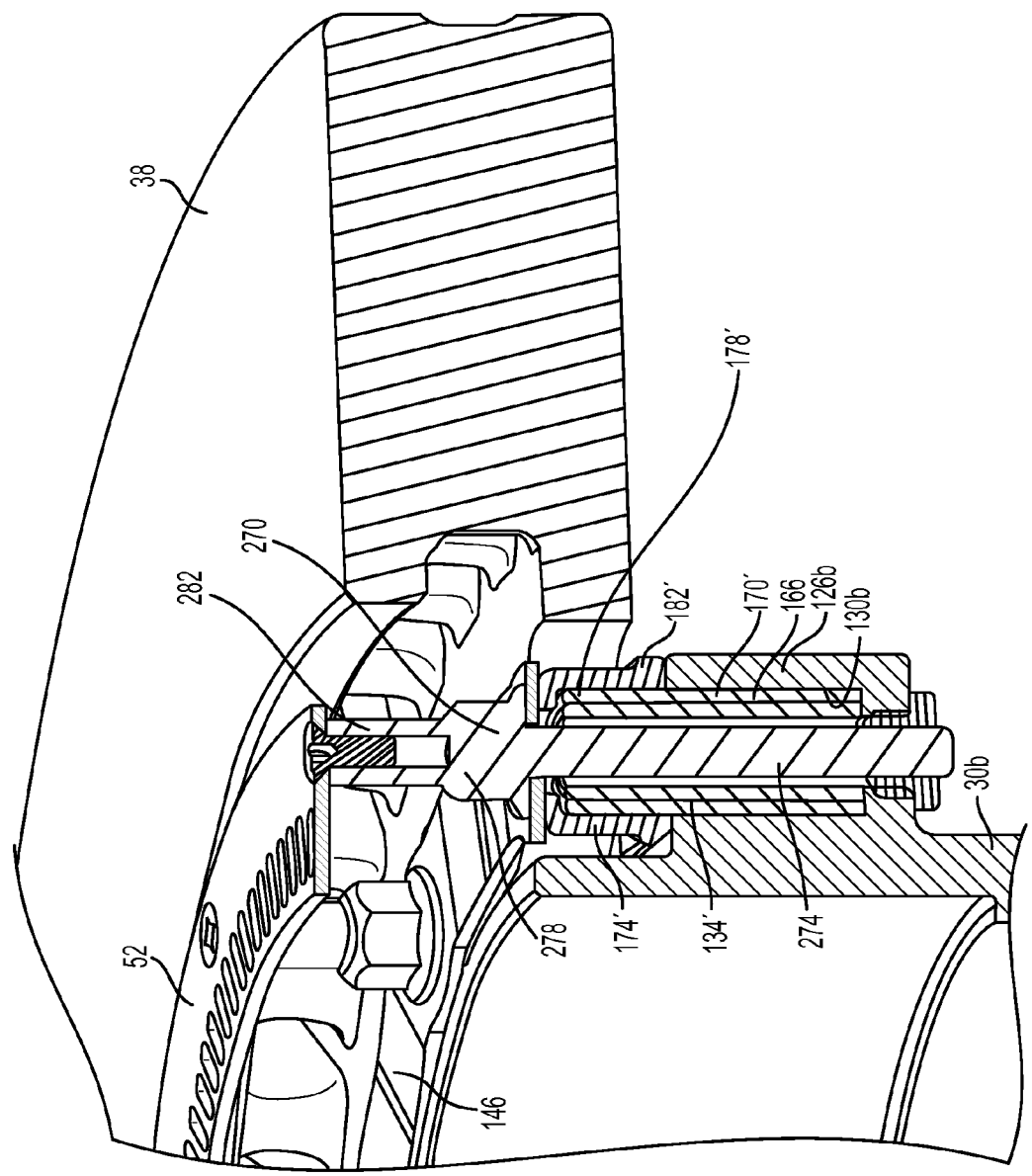
Figure 20:
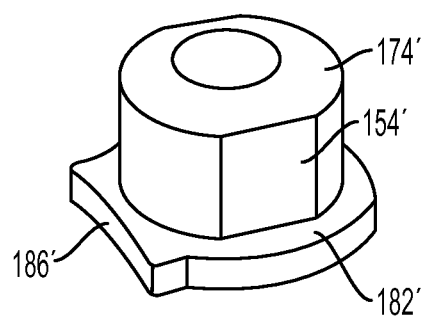
FIG. 20 illustrates a cap of a multi-piece torque pin.
Figure 21:
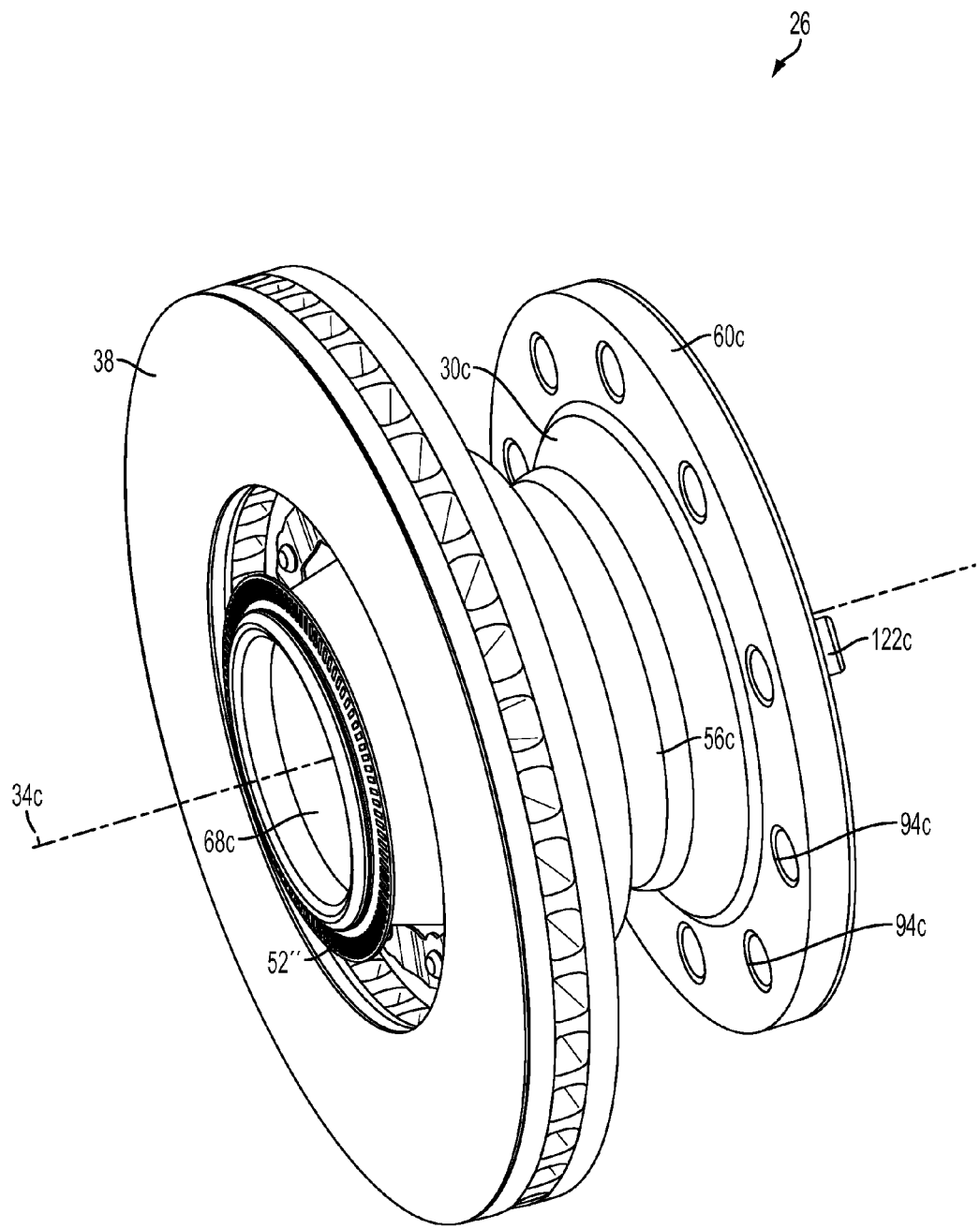
FIG. 21 is a perspective view of another embodiment of a brake hub assembly.
Figure 22:
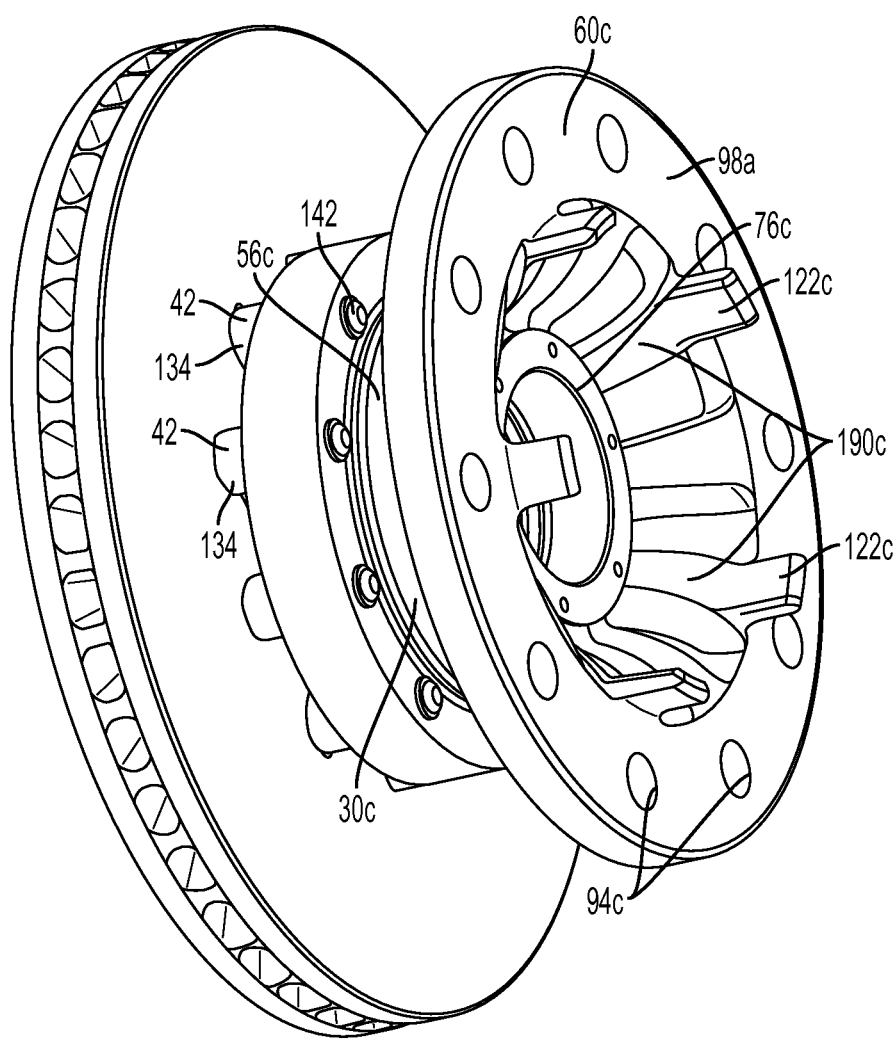
FIG. 22 is a rear perspective view of the brake hub assembly of FIG. 21.
Figure 23:
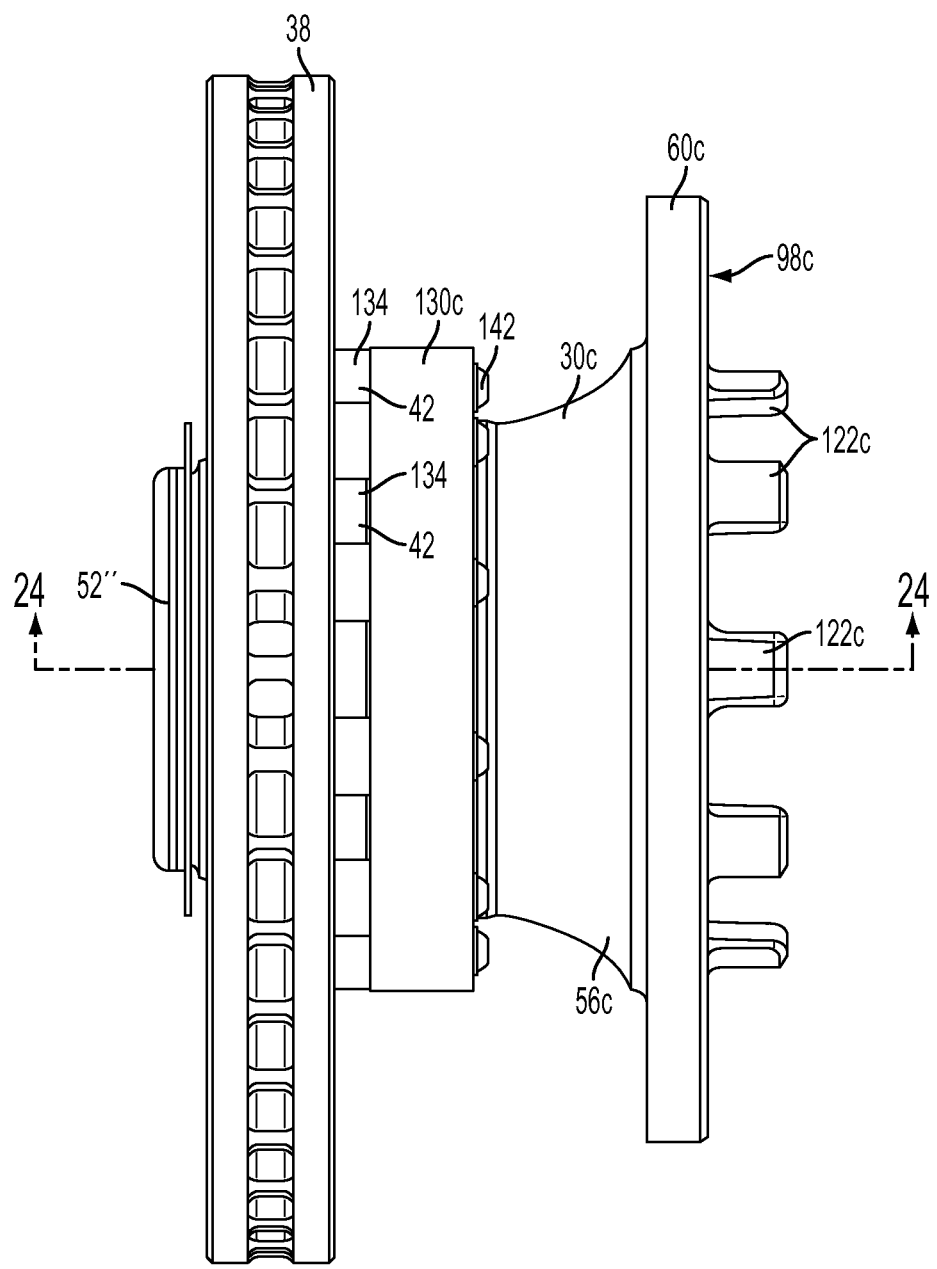
FIG. 23 is a side view of the brake hub assembly of FIG. 21.
Figure 24:
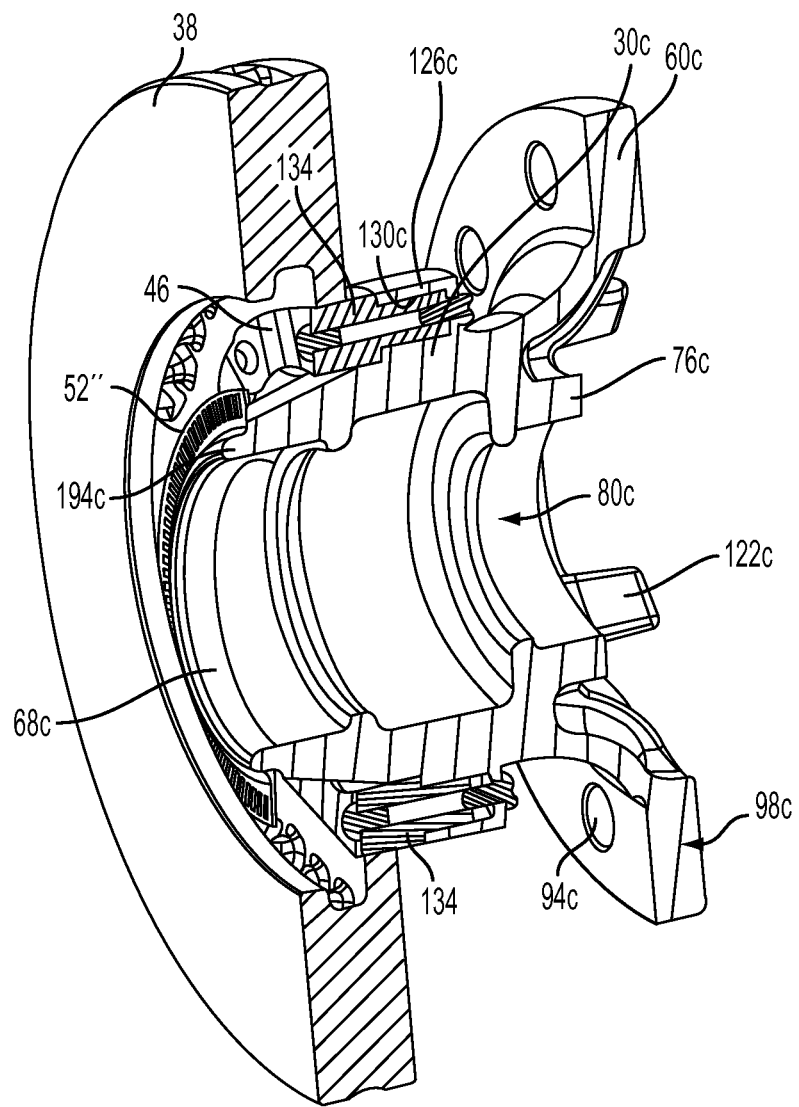
FIG. 24 is a section view taken along lines 24-24 of FIG. 23.
Figure 25:
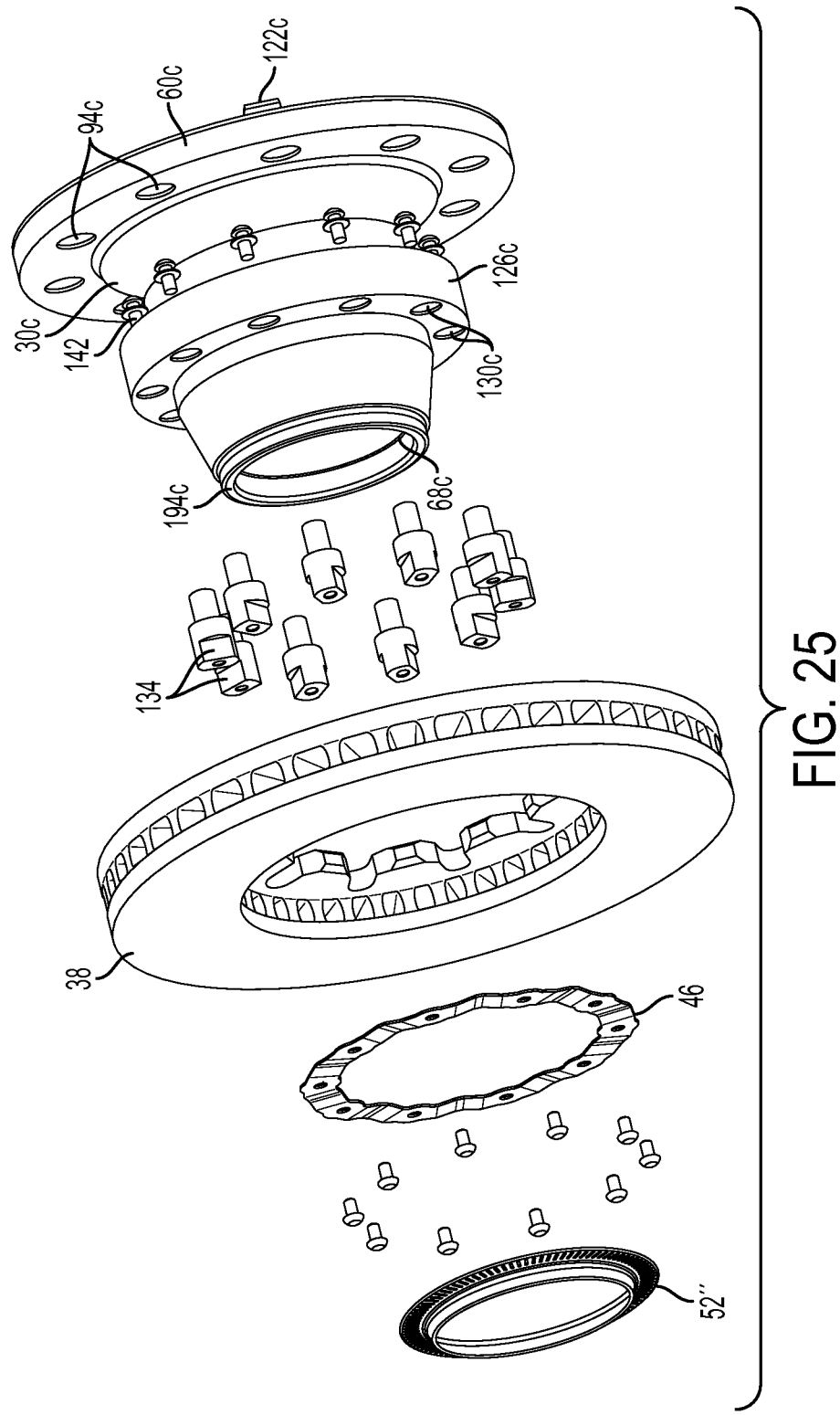
FIG. 25 is an assembly view of the brake hub assembly of FIG. 21.
Figure 26:
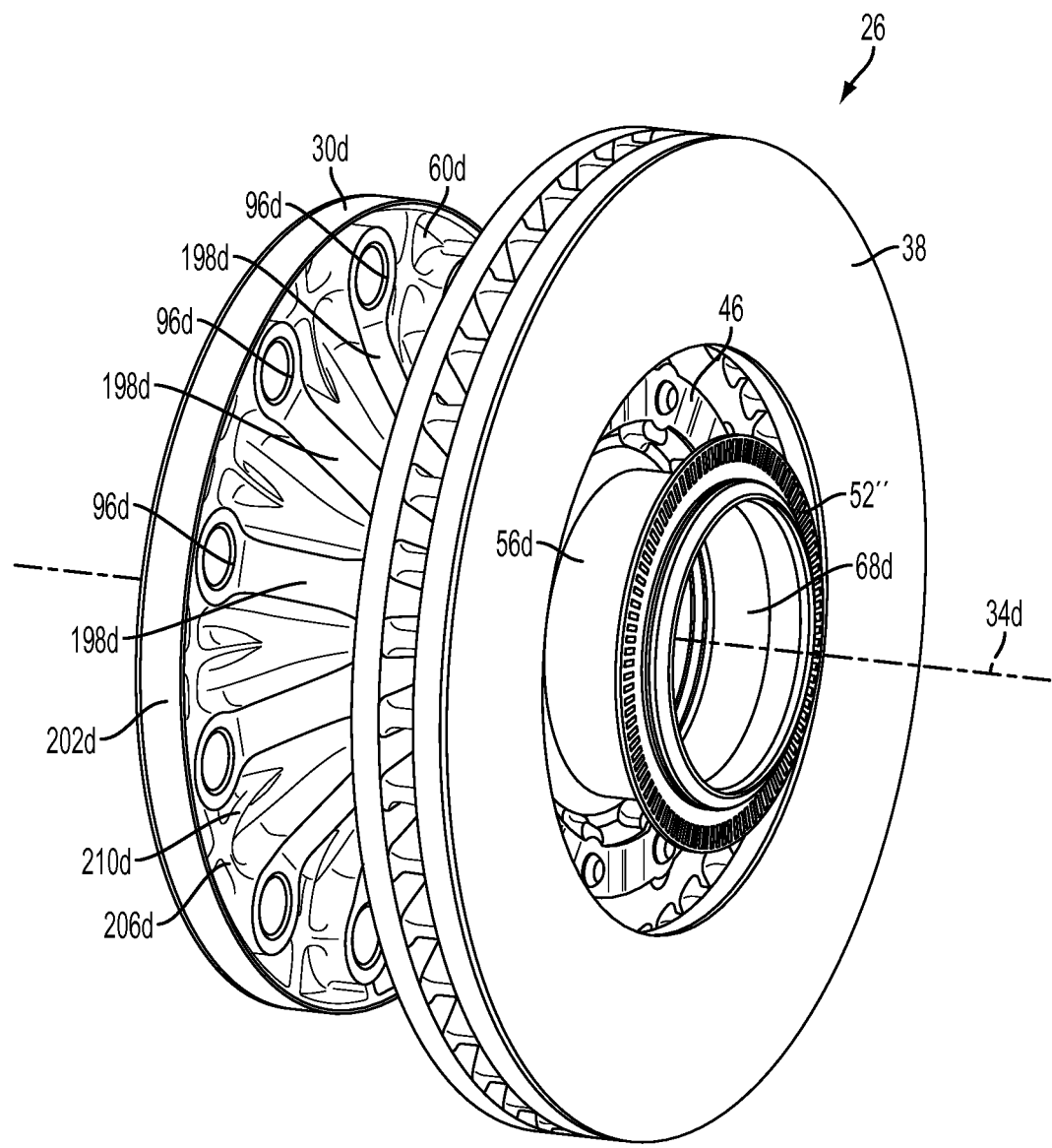
FIG. 26 is a perspective view of another embodiment of a brake hub assembly.
Figure 27:
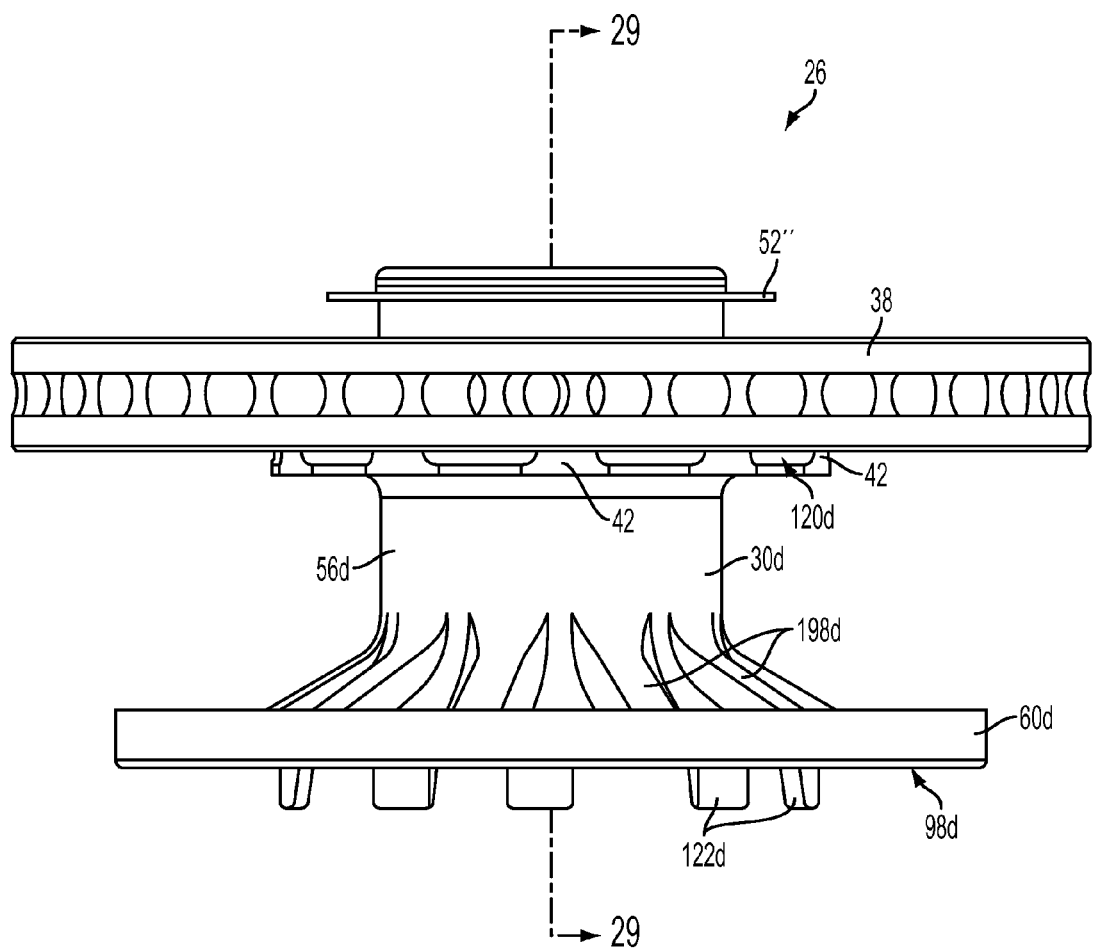
FIG. 27 is a side view of the brake hub assembly of FIG. 26.
Figure 28:
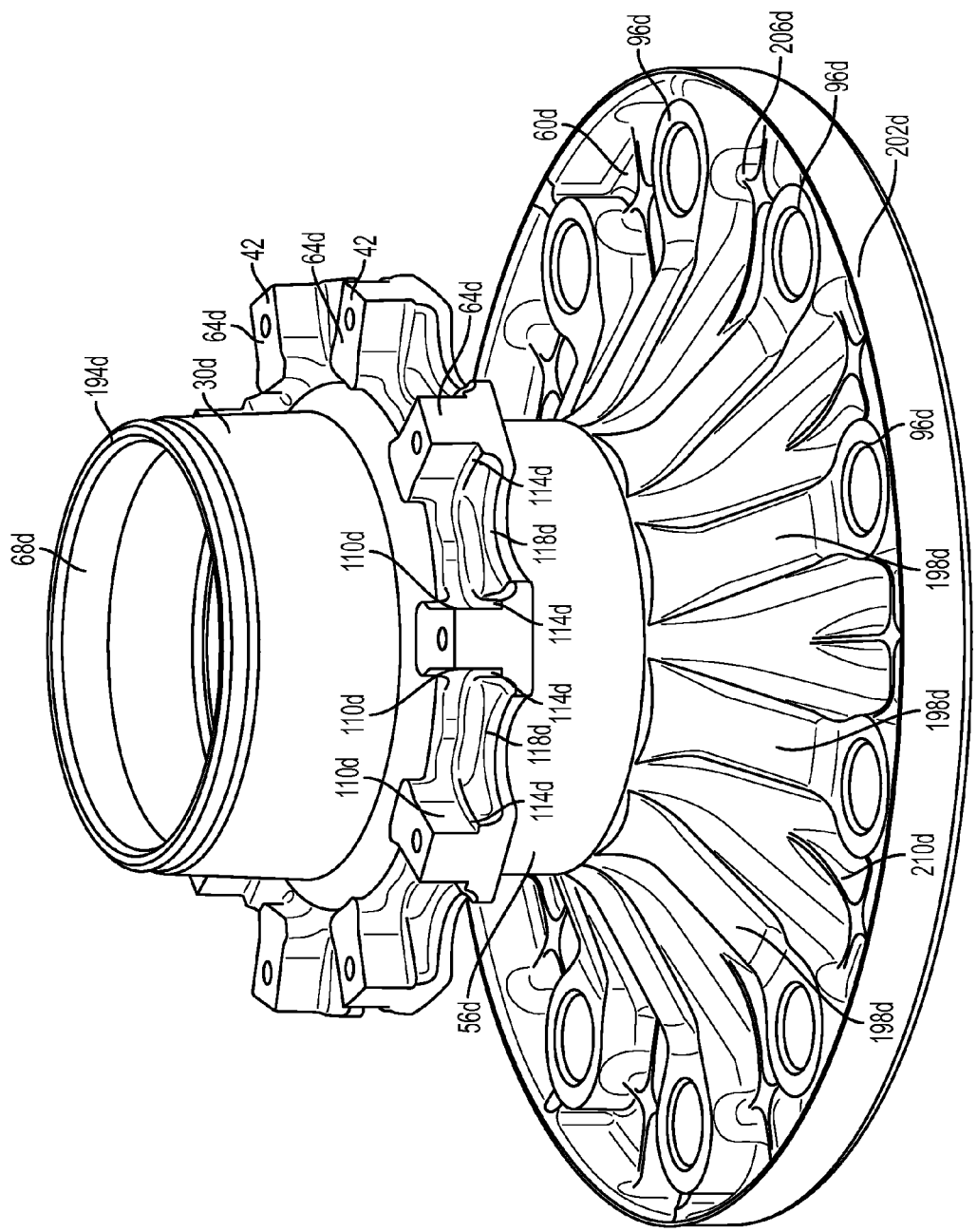
FIG. 28 is a perspective view of the brake hub assembly of FIG. 26 with the brake disk removed.
Figure 29:
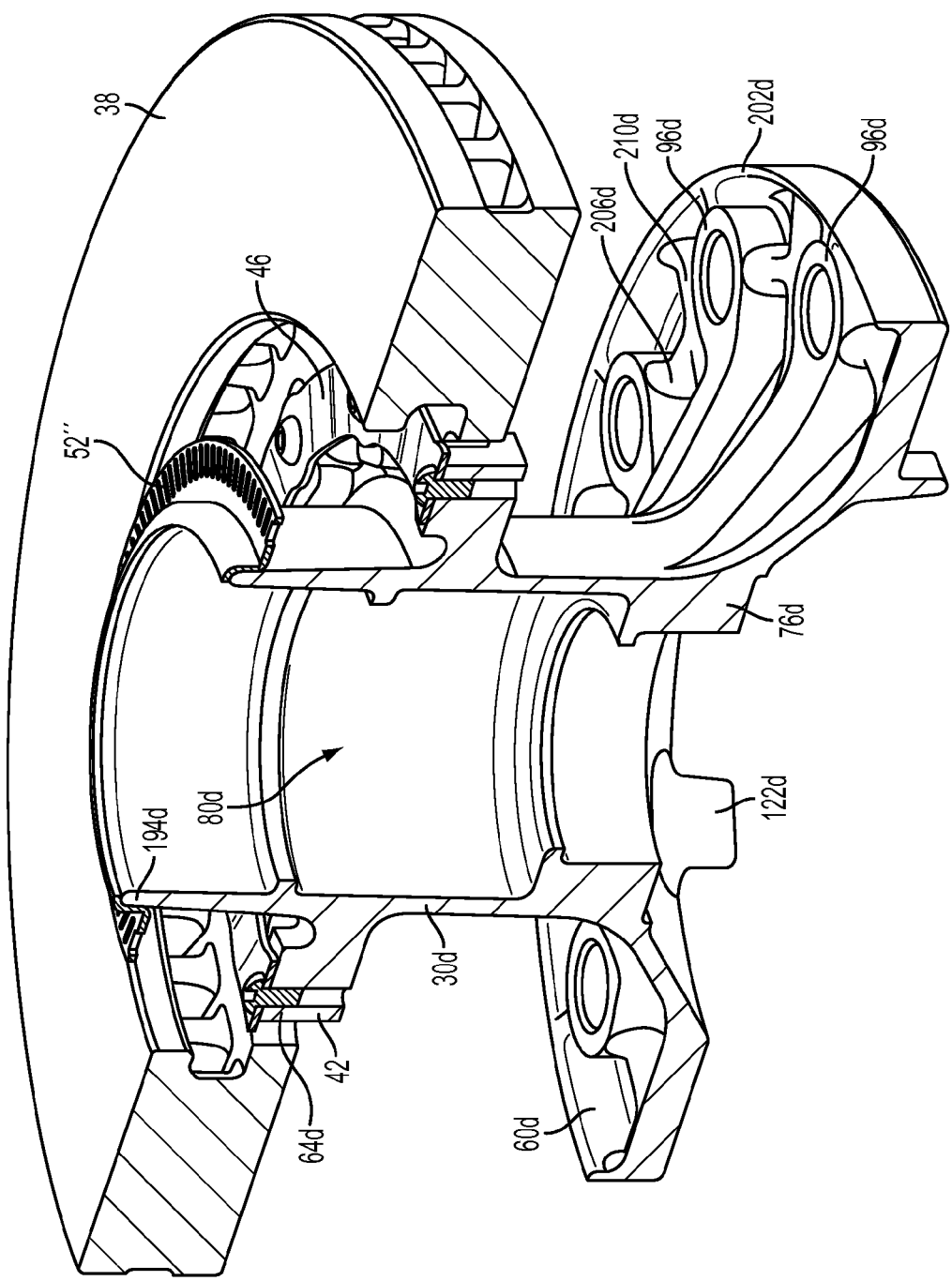
FIG. 29 is a section view taken along lines 29-29 of FIG. 27.
Figure 30:
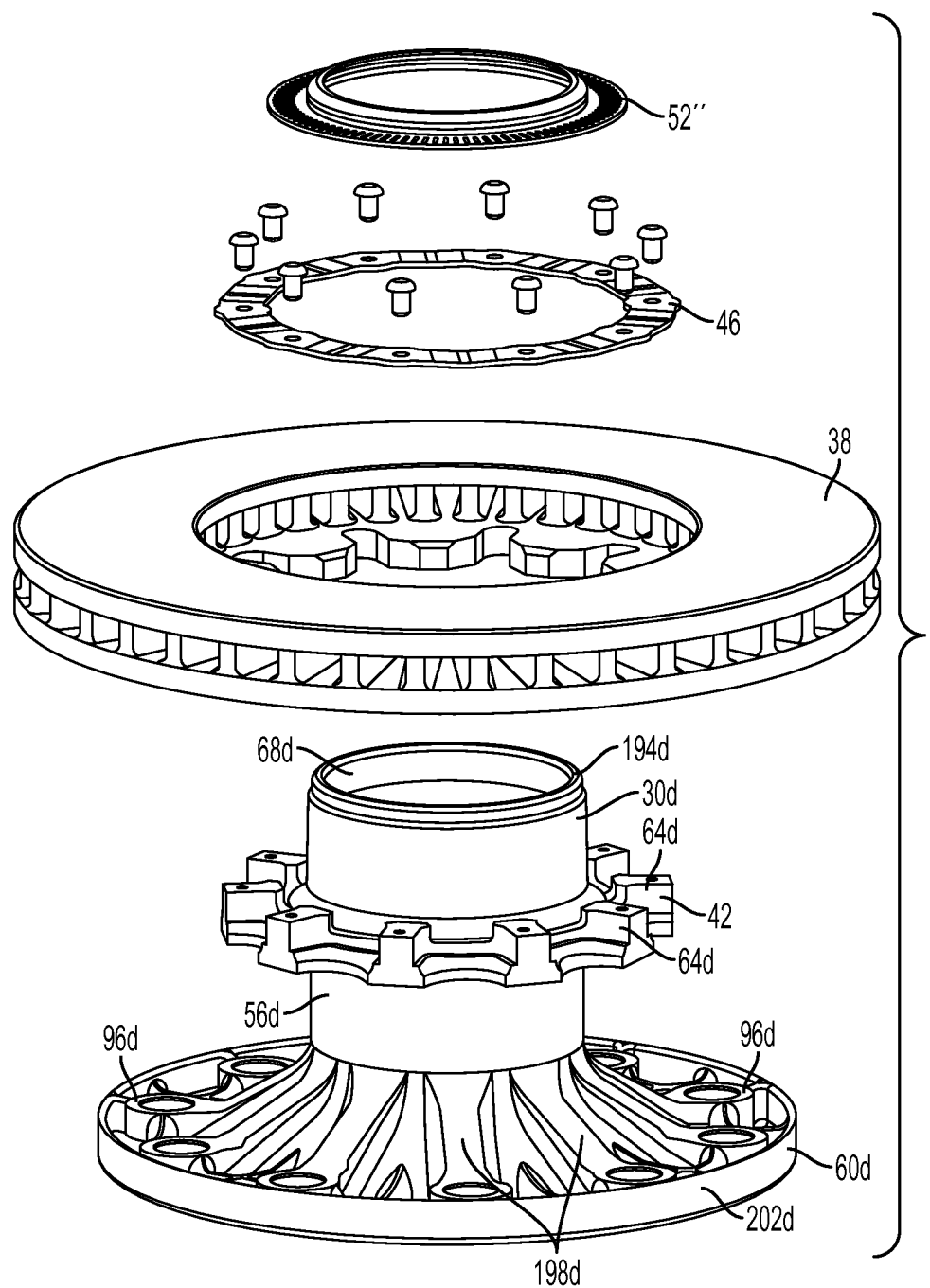
FIG. 30 is an assembly view of the brake hub assembly of FIG. 26.

Illustrated in FIG. 16a-16c, alternate constructions of the torque pin 134 may comprise a cylindrical roll spring 166. The cylindrical roll spring 166 is formed from a spirally rolled piece of metal. Unlike the tubular metal body torque pin in FIG. 12, the roll spring 166 torque pin can expand and contract to compensate for variations in aperture size, allowing for greater tolerances during the hub manufacturing process. The roll spring 166 also has superior thermal isolation properties when compared to the torque pin of FIG. 12. As shown in FIG. 16a, the roll spring 166 also includes a pair of substantially parallel side walls or flats 154 formed in the same size and manner as described above. The roll spring 166 may also be used with, or include a spacer 162 (not shown).

Illustrated in FIGS. 17-20, alternate constructions of the torque pin may include a multi-piece design. The multi-piece torque pin 134' includes a stud 170' to be partially received within an aperture 130b of the mounting flange 126b, and a separately formed cap 174' mated with the distal end 178' of the stud 170'. The stud 170' of the multi-piece torque pin 134' may be formed as either a cylindrical roll spring or a tubular piece and can be coupled to the mounting flange 126b in much the same way as the previous torque pin designs (see FIGS. 18 and 19).

The cap 174' of the multi-piece torque pin 134' is substantially cylindrical in shape and is configured to substantially encompass the distal end 178' of the stud 170'. The cap 174' includes a pair of substantially parallel side walls or flats 154' (described above) to be received within and moveable along the radial slots 254 of the brake disk 38, and an integral spacer 182' to space the brake disk 38 from the mounting flange 126b of the hub 30b. In the illustrated construction, the spacer 182' also includes a curved edge 186' (see FIG. 20), that interacts with the hub body 30b to limit the rotation of the cap 174' on the stud 170'. Unlike the above described embodiments of the torque pins 134, the multi-piece torque pin 134' does not need to be properly oriented when being installed on the hub 30b; rather, the cap 174' is free to rotate with respect to the stud 170' to assure the flats 154' are always properly aligned with the slots 254 of the disk 38. Furthermore, the cap 174' may be formed from a low thermally conductive material, such as stainless steel, steel, or ceramic (e.g., zirconium ceramic).

FIGS. 21-25 illustrate a third hub embodiment 30c of the hub assembly 26 formed (e.g., cast) from an aluminum alloy similar to the second hub embodiment 30b. In the third construction of the hub 30c, the hub employs much of the same structure and has many of the same properties as the previously-described hub designs 30a, 30b shown in FIGS. 2-5 and 6-9. Analogous elements have been given the same number and reference letter "c". The following description of the hub 30c focuses primarily upon structure and features different than the previously-described constructions.

The third hub embodiment 30c includes a wheel flange 60c that extends radially and axially outwardly from the outboard end 76c of the hub 30c. In the illustrated construction, the mounting surface 98c of the wheel flange 60c is positioned axially outboard of the hub body 56c and defines a plurality of wheel stud apertures 94c, each configured to receive a corresponding wheel stud (not shown). To help reinforce the wheel flange 60c, a plurality of reinforcing ribs 190c are formed into the flange itself. The ribs 190c extend generally radially along the outboard side of the flange 60c.

The third hub embodiment 30c also includes a plurality of (e.g., five) wheel pilots 122c, each extending axially outwardly from the mounting surface 98c of the wheel flange 60c. As described above, the wheel pilots 122c are positioned to align the wheel with the central axis 34c of the hub 30c. The inboard end 68c of the third hub embodiment 30c includes a ridge 194c, formed into the body 56c and configured to act as a mounting guide for a press-on style tone ring 52".

FIGS. 26-31 illustrate a fourth hub embodiment 30d of the hub assembly 26 formed (e.g., cast) from austempered ductile iron similar to the first hub embodiment 30a. In the fourth construction of the hub 30d, the hub employs much of the same structure and has many of the same properties as the previously-described hub designs 30a, 30b, 30c shown in FIGS. 2-5, 6-9, and 21-25. Analogous elements have been given the same number and the reference letter "d". The following description of the hub 30d focuses primarily upon structure and features different than the previously-described construction.

Similar to the third hub embodiment 30c, the wheel flange 60d of the fourth hub embodiment 30d extends radially and axially outwardly from the outboard end 76d of the hub body 56d to position the mounting surface 98d axially outboard of the body 56d. The wheel flange 60d also includes a plurality of reinforcing ribs 198d, each extending between the hub body 56d and the flange 60d to provide rigidity and support. In the illustrated construction, each rib 198d is generally spaced evenly along the circumference of the flange 60d and includes a wheel stud boss 96d formed therein.

The wheel flange 60d also includes a perimeter rib 202d, an annular rib 206d extending around the flange and radially inward from the perimeter rib 202d, and one or more secondary ribs 210d extending radially and generally perpendicular to ribs 202d, 206d. The perimeter rib 202d extends along the outer diameter of the wheel flange 60d at a height greater than the height of the wheel stud bosses 96d. The annular rib 206d is concentric with the perimeter rib 202d, generally extending between the various wheel stud bosses 96d at a height lower than the bosses themselves. Various combinations of radially and circumferentially extending ribs may also be present dependent upon the specific construction. In alternate constructions, the height and thickness of each rib 202d, 206d, and 210d can vary.

Figure 31:
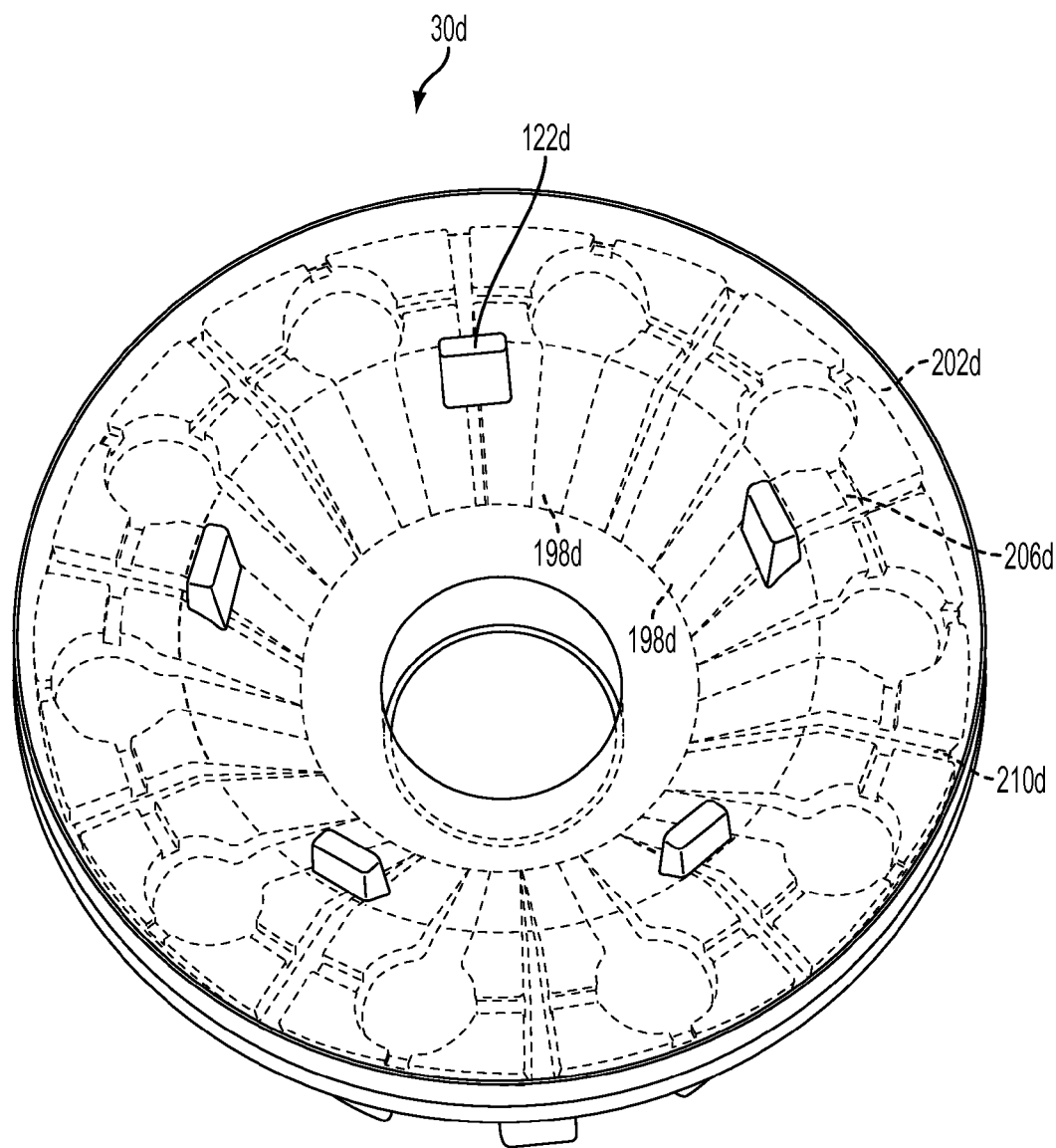
FIG. 31 is a front view of the raw casting used in the hub of the brake hub assembly of FIG. 26.

Illustrated in FIG. 31, the fourth hub embodiment 30d also includes a plurality of (e.g., five) wheel pilots 122d, each extending axially outwardly from the mounting surface 98d of the wheel flange 60d. The wheel pilots 122d are positioned to align the wheel with the central axis 34d of the hub 30d. The wheel pilots 122d are also each staggered with respect to the reinforcing ribs 198d, or located between ribs 198d, to limit casting porosity. When the wheel pilots 122d are staggered from the ribs 198d, the overall thickness of the cast material is minimized, thereby substantially reducing any porosity that may be present.

Figure 32:
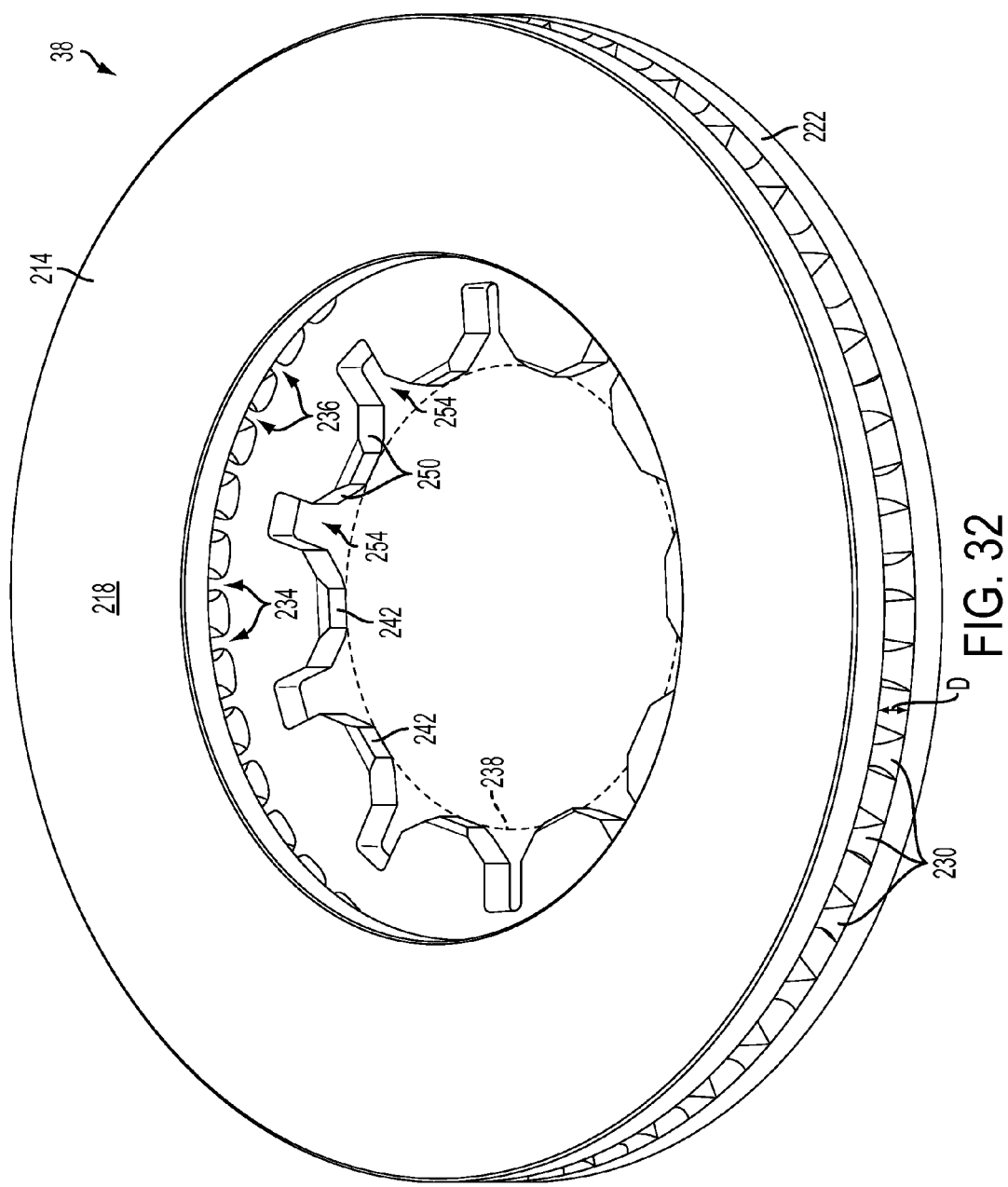
FIG. 32 is a perspective view of a brake disk.
Figure 33:
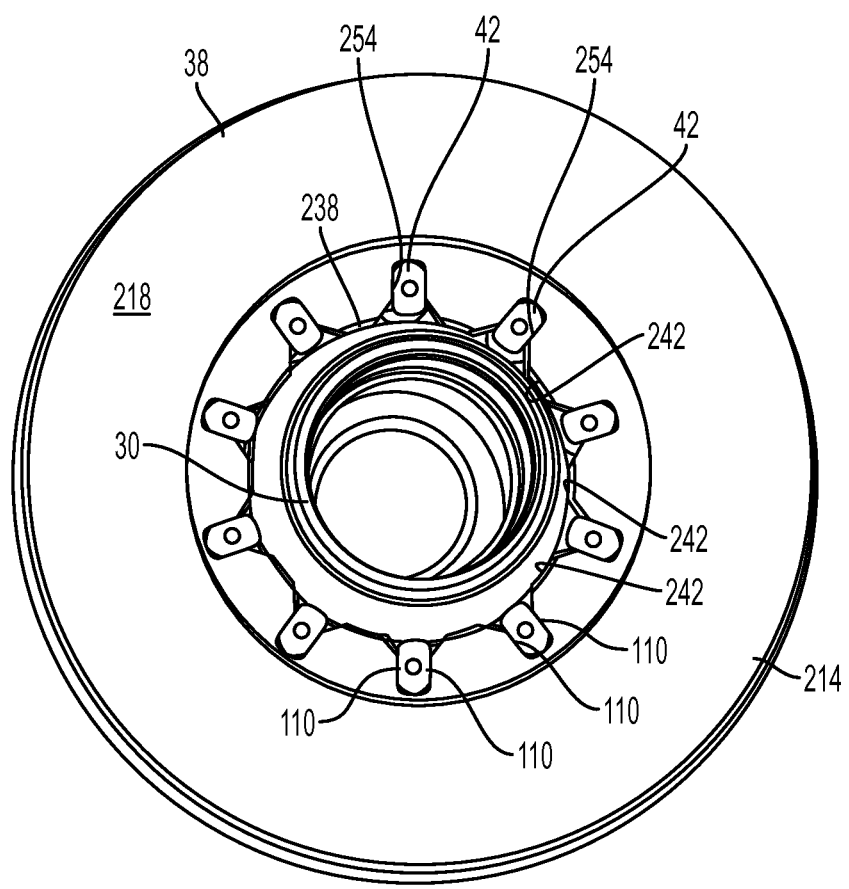
FIG. 33 is a detailed view of the brake disk of FIG. 32 installed on a brake hub.
Figure 34:
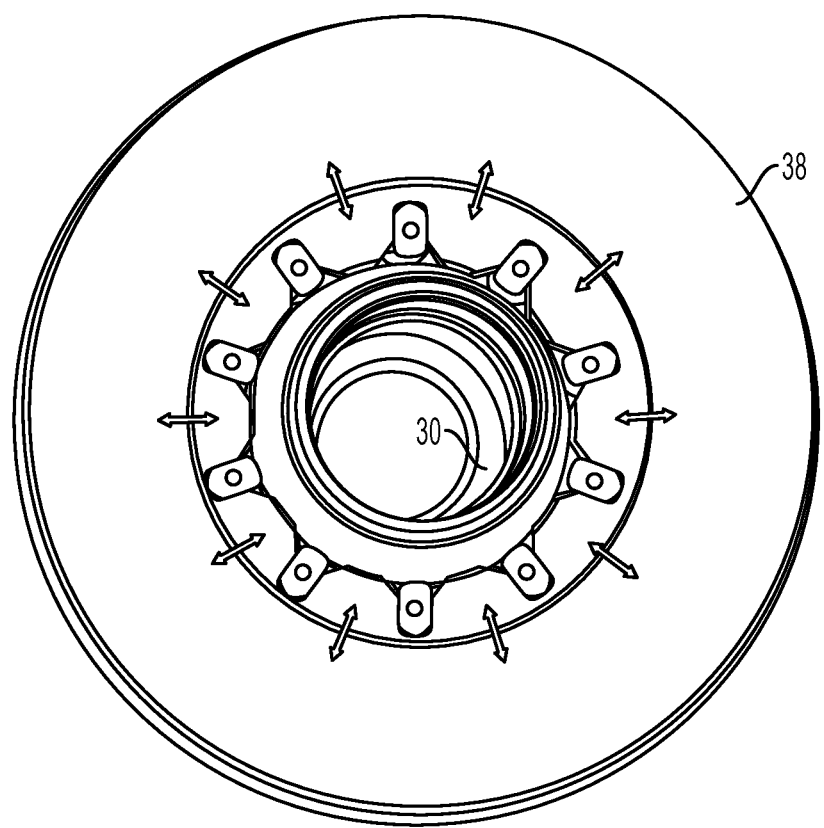
FIG. 34 illustrates the thermal expansion and contraction of the brake disk of FIG. 32 with respect to a brake hub.

Illustrated in FIGS. 32-34, the hub assembly 26 also includes a brake disk 38. The brake disk 38 includes a first plate 214 having a first brake surface 218, and a second plate 222 spaced axially from the first plate 214 and having a second brake surface 226. The brake disk 38 also includes a plurality of ribs or vanes 230 extending radially between the first and second plates 214, 222 to define a plurality of cooling channels 234 therebetween. During operation of the hub assembly 26, air flows through the cooling channels 234 of the brake disk 38 to at least partially regulate the temperature of the disk 38.

Furthermore, the second plate 222 of the brake disk 38 extends radially inwardly of the inner diameter of the first plate 214 to define a pilot diameter 238. In the illustrated construction, the pilot diameter 238 includes a plurality of pilot surfaces 242, each configured to engage the pilot cylinder 246 of the hub and position the brake disk 38 co-axially with the hub along the central axis. In the illustrated construction, each pilot surface 242 includes a pair of chamfers 250, to minimize the contact area between the hub and the disk 38 to reduce heat transfer. In the illustrated construction, less than about 11% of the circumference of the pilot diameter 238 of a 6.8" disk 38 is in contact with the hub.

The second plate 222 of the brake disk 38 also defines a plurality of radial slots 254. Each slot 254 is open to the pilot diameter 238 and extends radially outwardly, separating two pilot surfaces 242. In the illustrated construction, each slot 254 is sized to receive a torque member 42 therein (see FIG. 33). More specifically, each slot 254 is sized to receive the head 150 of a torque pin 134 (e.g., in the second and third embodiments, see FIG. 8) or a torque lug 64a, 64d (e.g., in the first and fourth hub embodiments, see FIG. 3). To promote better airflow when the disk 38 is installed on the hub, at least 90% of the area of the interior opening 236 of each channel 234 is positioned above the torque members 42 of the hub so as to minimize any resistance to the airflow. Stated differently, the torque members 42 do not extend axially beyond the second plate 222 of the brake disk 38 by more than 10% of the distance D between the first plate 214 and the second plate 222 (see FIG. 32).

When installed on the hub, the brake disk 38 is allowed to "float" with respect to the hub to compensate for differences in thermal expansion between the two entities. More specifically, the torque members 42 move within the slots 254 of the brake disk 38 as the disk expands and contracts (see FIG. 34). This allows the torque members 42 to transfer braking torque from the brake disk 38 to the hub without restraining the brake disk 38 from thermally induced movement.

Figure 35A:
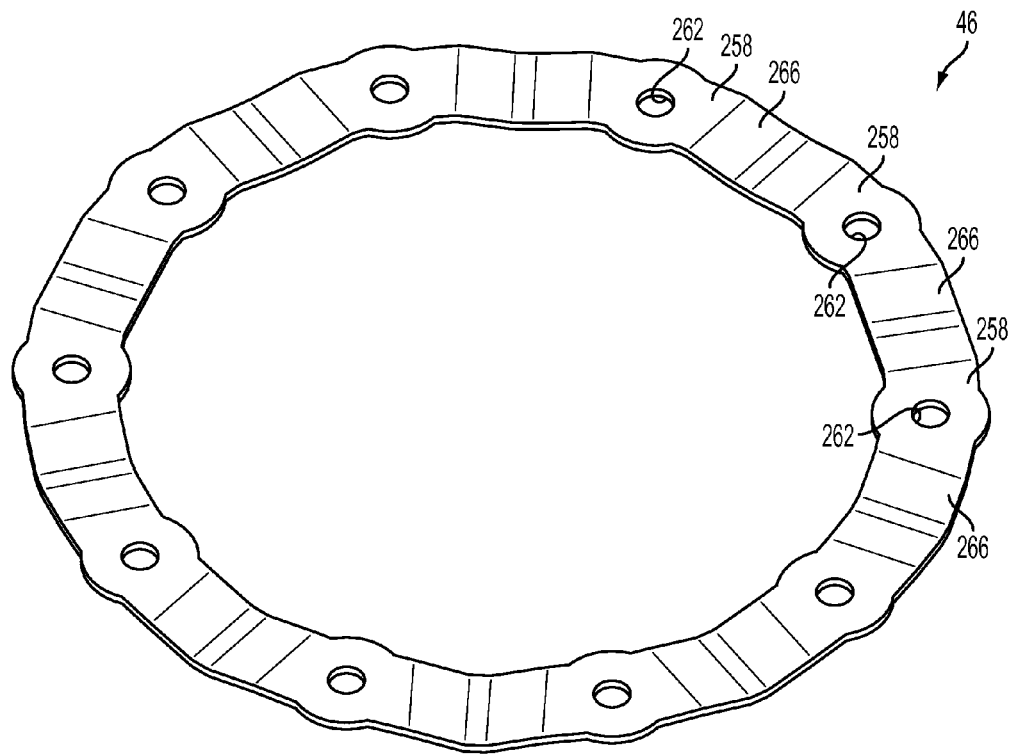
FIGS. 35a and 35b illustrate an axial preload spring.
Figure 35B:
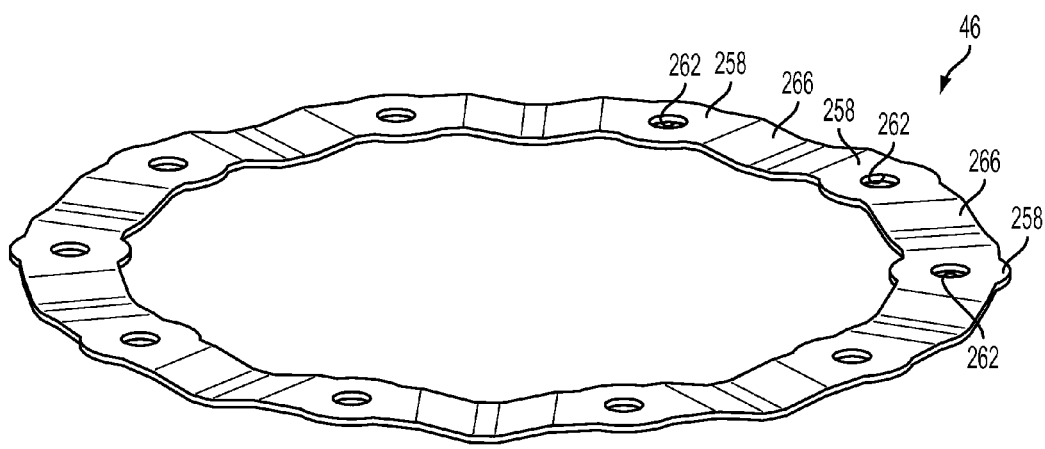

Illustrated in FIGS. 35 and 35a, the hub assembly 26 also includes an axial preload spring 46 coupleable to the hub to secure the brake disk 38 thereto. The axial preload spring 46 is substantially annular in shape and is formed from stamped spring steel. The spring 46 generally includes a plurality of circumferentially spaced base portions 258, each defining an aperture 262, and a plurality of substantially V-shaped spring portions 266 each extending between adjacent base portions 258. When the hub assembly is complete, each base portion 258 of the spring 46 is coupled to a respective torque member 42 of the hub by a stand off screw 270. The spring portions 266 contact the brake disk 38 and axially bias the disk 38 towards the center of the hub. During operation, the preload spring 46 works in tandem with at least one of the spacers 162, the support ledges 114a, 114d, the mounting flange 126b, 126c, and the like to allow the disk 38 to move axially or "float" with respect to the hub. Although the axial preload spring 46 is shown as a single, annular unit, in alternate constructions, the spring 46 may be separated into one or more separate spring members (not shown).

Figure 36:
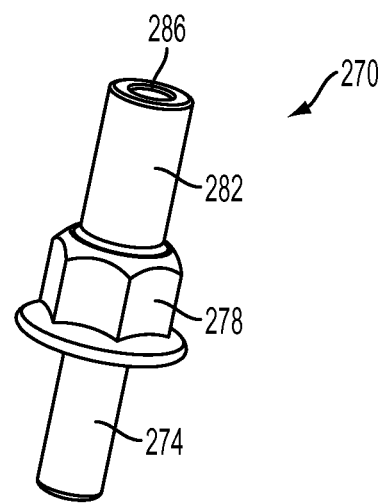
FIG. 36 is a perspective view of a stand off screw.
Figure 36A:
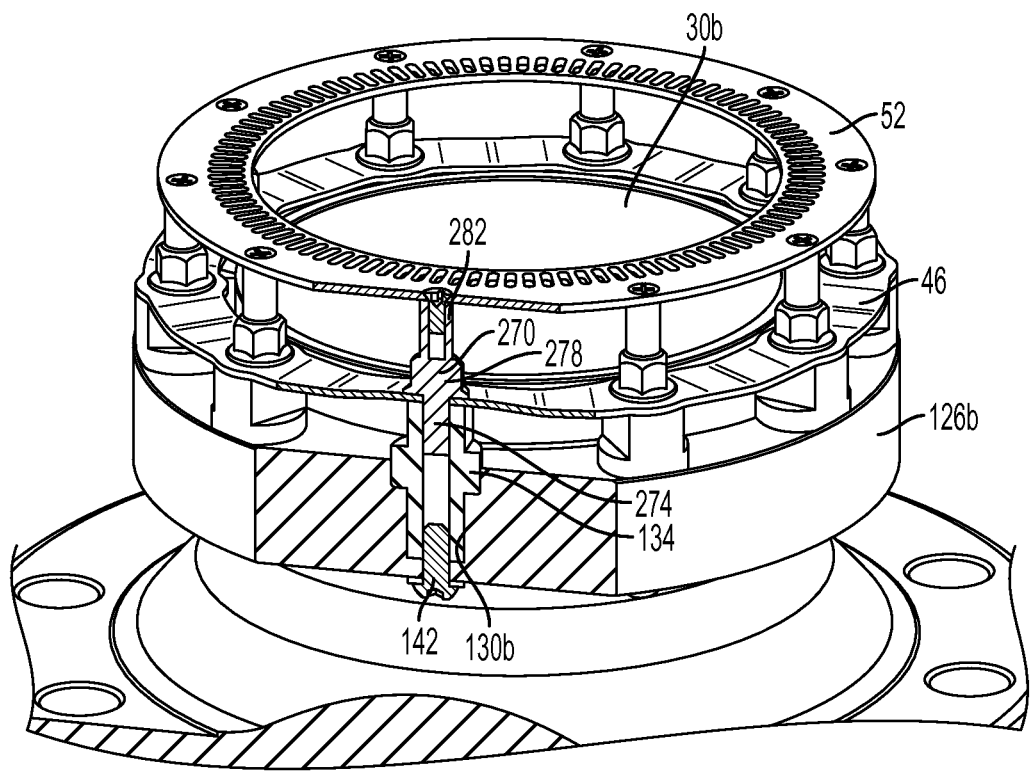
FIG. 36a illustrates the stand off screw of FIG. 36 installed on the brake hub assembly of FIG. 6.
Figure 36B:
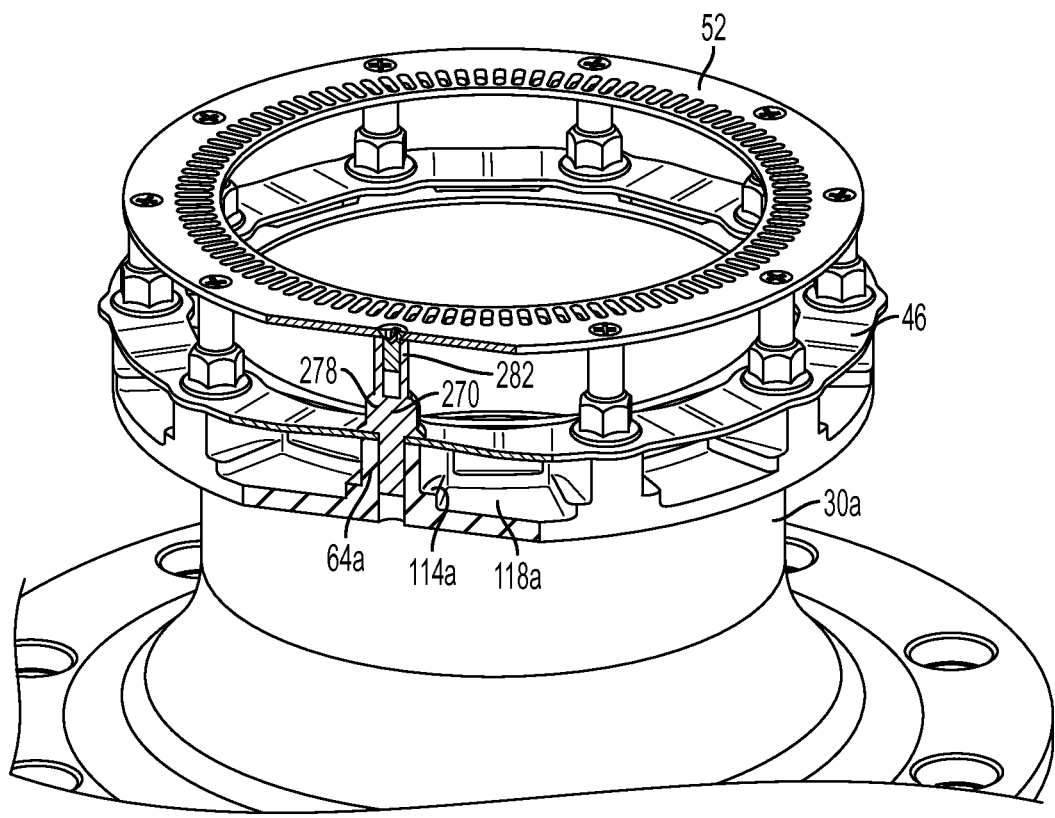
FIG. 36b illustrates the stand off screw of FIG. 36 installed on the brake hub assembly of FIG. 2.
Figure 37:
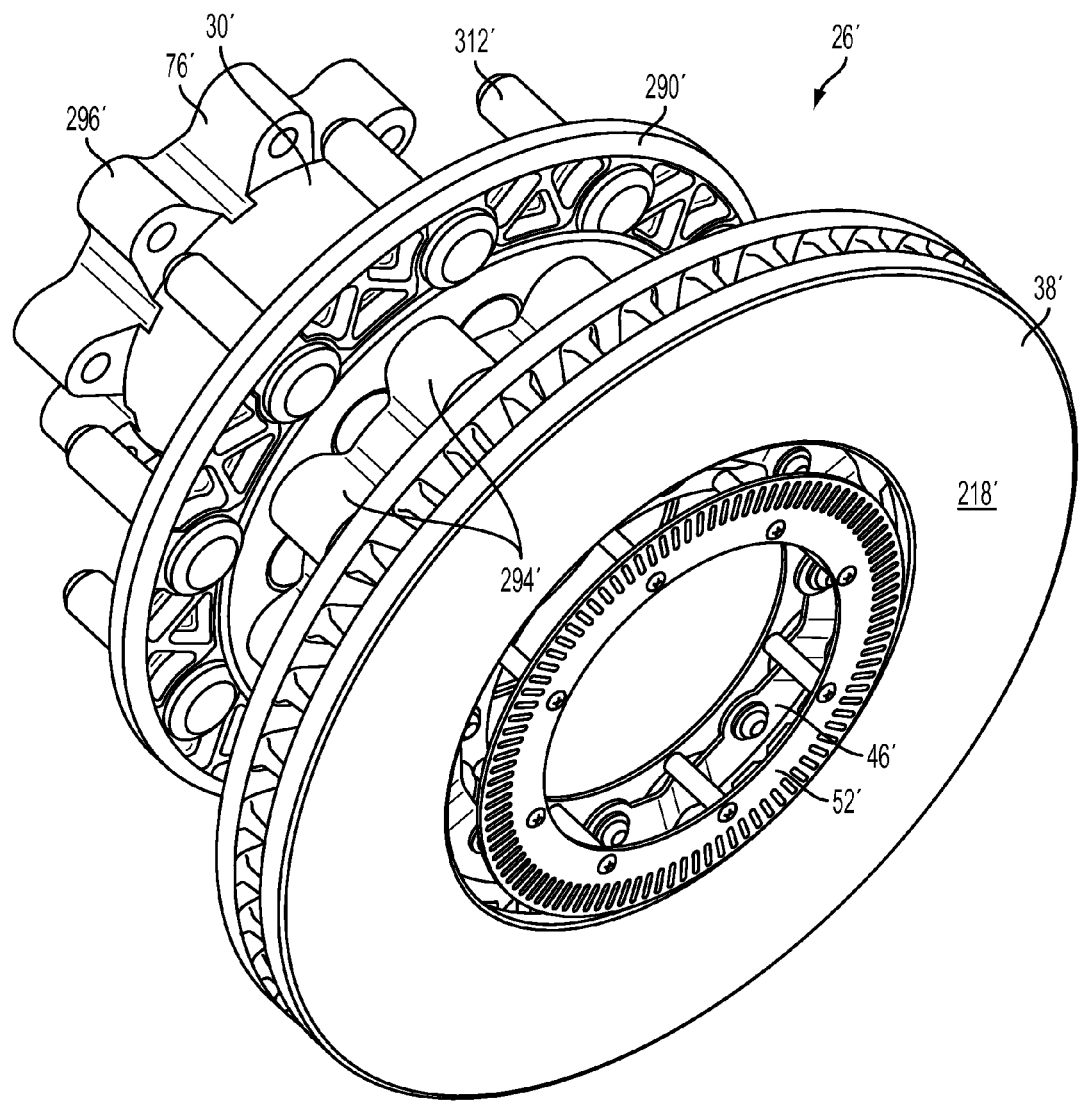
FIG. 37 is a perspective view of another brake hub assembly.
Figure 38:
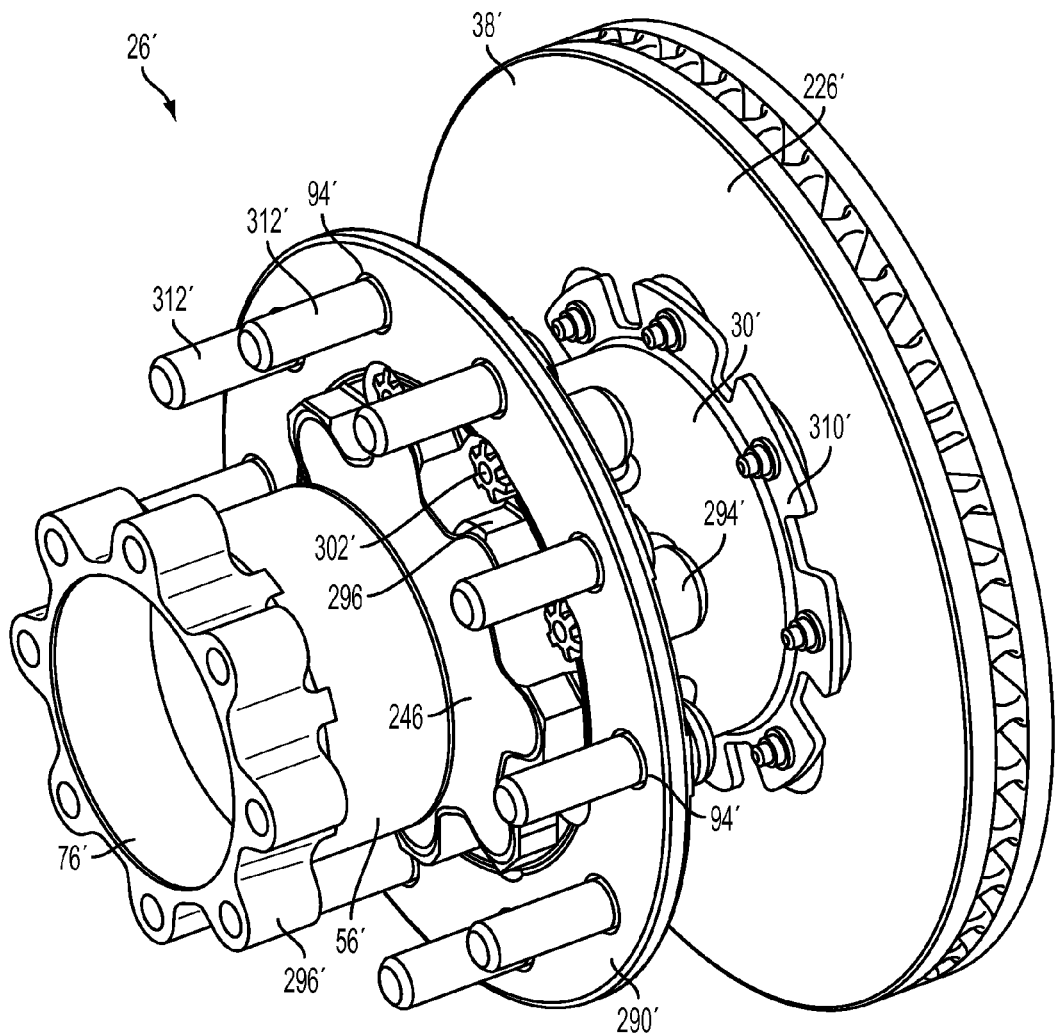
FIG. 38 is a rear perspective view of the brake hub assembly of FIG. 37.

Illustrated in FIG. 36-36b, the hub assembly 26 also includes a plurality of stand off screws 270, each having a mounting portion 274, a body 278, and an extension portion 282 opposite the mounting portion 274. The stand-off screws 270 secure the axial preload spring 46 to the hub while also providing a thermally isolated mounting for the tone ring 52 so that it is spaced a distance from the hub. When the hub is assembled, the mounting portion 274 of each stand off screw 270 is coupled (e.g., threadably engaged) to a corresponding torque member 42 of the hub, securing the spring 46 to the torque members 42, and the extension portion 282 extends axially outwardly from the hub to produce a threaded aperture 286. In addition to providing a mount for the tone ring 52, the extension portion 282 is configured to provide minimal resistance to the airflow through the channels 234 of the brake disk 38.

The hub assembly 26 also includes a tone ring 52. The tone ring 52 is substantially annular in shape, and includes a plurality of recesses spaced evenly about the circumference of the ring. The tone ring 52 interacts with a sensor (not shown) to allow the user to monitor the rotation of the hub assembly 26 with respect to the axle 18. In alternate constructions, the tone ring 52 may include a plurality of cuts or protrusions in place of the recesses, dependent upon the style of sensor being used. In the first and second hub embodiments 30a, 30b, the tone ring 52 is coupled to the extension portion 282 of the standoff screw 270, however in the third and fourth hub embodiments 30c, 30d, a press-on tone ring 52" is coupled directly to the hub body 56b, 56d.

The brake hub assembly 26 is typically pre-assembled as a unit before being installed on the suspension 14 of a motor vehicle 10. To assemble the unit, the user axially introduces the brake disk 38 onto the inboard end of the hub, making sure to align each torque member 42 with a corresponding slot 254 and the pilot surfaces 242 with the pilot cylinder of the hub. Dependent upon the hub design being used, either a torque lug 64a, 64d (e.g., in the first and fourth embodiments, see FIG. 3) or the head 150 of a torque pin 134 (e.g., in the second and third embodiments, see FIG. 8) is positioned within each radial slot 254.

The axial preload spring 46 is then positioned on the hub making sure to align each base portion 258 with a corresponding torque member 42 and each spring portion 266 with the brake disk 38. When positioning the axial preload spring 46, it is important to make sure the spring is oriented so that the spring portions 266 are directed towards the brake disk 38, causing the spring to bias the disk 38 towards the center of the hub. In some constructions, the spring 46 is then coupled to the hub by a plurality of stand off screws 270, each of which pass through a corresponding aperture 262 of the spring 46. The tone ring 52 is then attached to the assembly 26 by coupling it to the extended portions 282 of the stand off screws 270. In other constructions, the axial preload spring 46 may be coupled directly to the hub with fasteners and the tone ring 52" may be pressed onto a corresponding ridge 194d (see FIG. 29). Once the assembly is complete, it may be installed onto the axle 18 of a motor vehicle 10 with the proper bearings and seals using the standard installation processes well known in the art.

Typically, a brake disk needs to be serviced or replaced, the user must first remove the hub assembly from the axle before the brake disk can be removed from the hub. Another hub assembly 26' is illustrated in FIGS. 37-45. This hub assembly 26' employs much of the same structure and has many of the same properties as the previously-described hub assembly 26 shown in FIGS. 1-31. Analogous elements have been given the same reference number and the prime symbol. The following description of the hub assembly 26' focuses primarily upon structure and features different than the previously-described construction.

Similar to the hub assembly 26, the hub assembly 26' is configured to be installed on the axle of a motor vehicle and act as a mounting location for one or more of the vehicle's wheels (not shown). In the hub assembly 26', the brake hub 30' is designed to allow the user to remove and install the brake disk 38', such as for maintenance or replacement, without having to remove the hub 30' from the axle, leaving the bearing assembly and seals undisturbed. In the illustrated construction, the hub assembly 26' includes a hub 30', a wheel flange plate 290', a brake disk 38', and an axial preload spring 46'.

Figure 39:
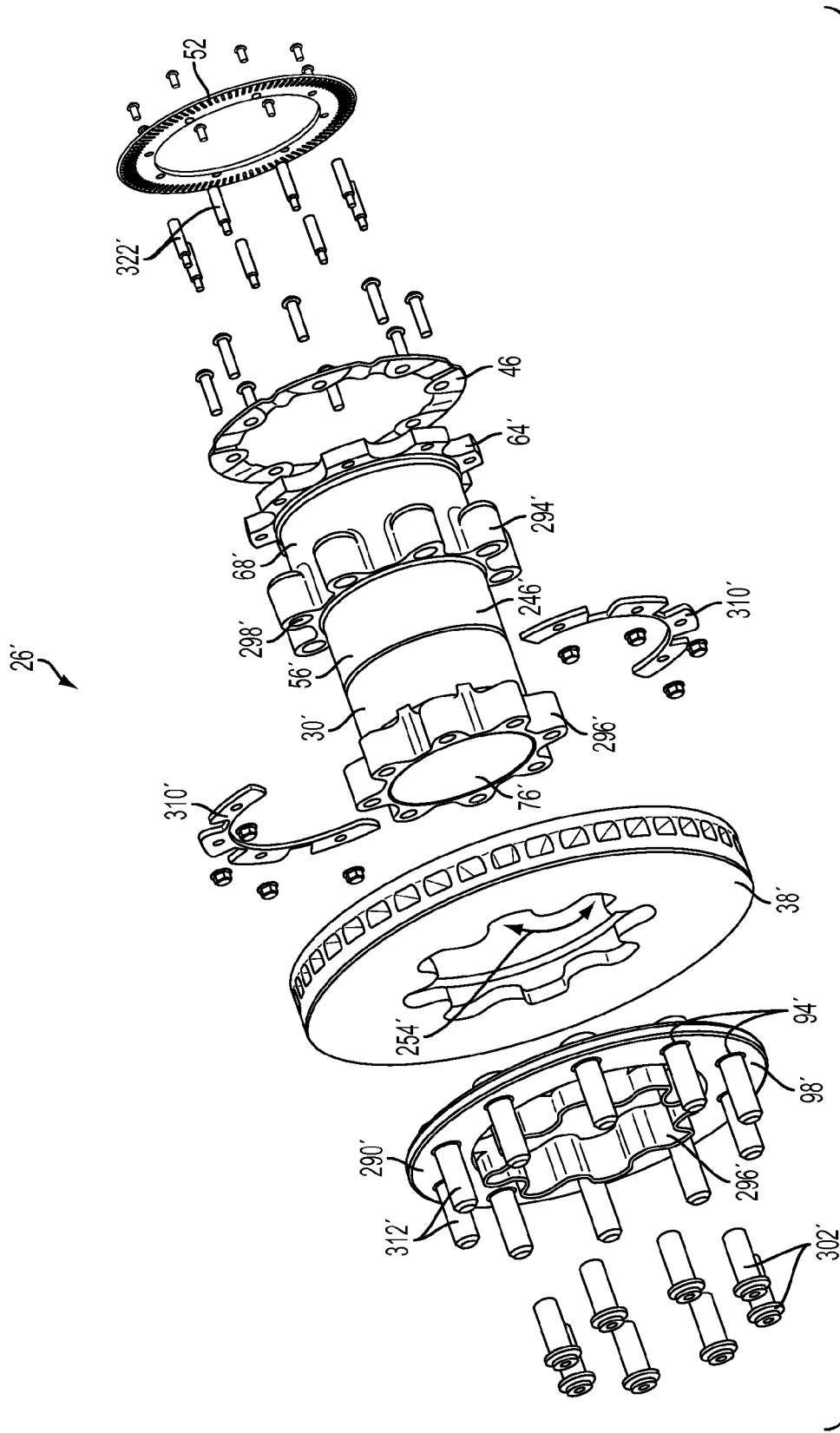
FIG. 39 is an assembly view of the brake hub assembly of FIG. 37.
Figure 40:
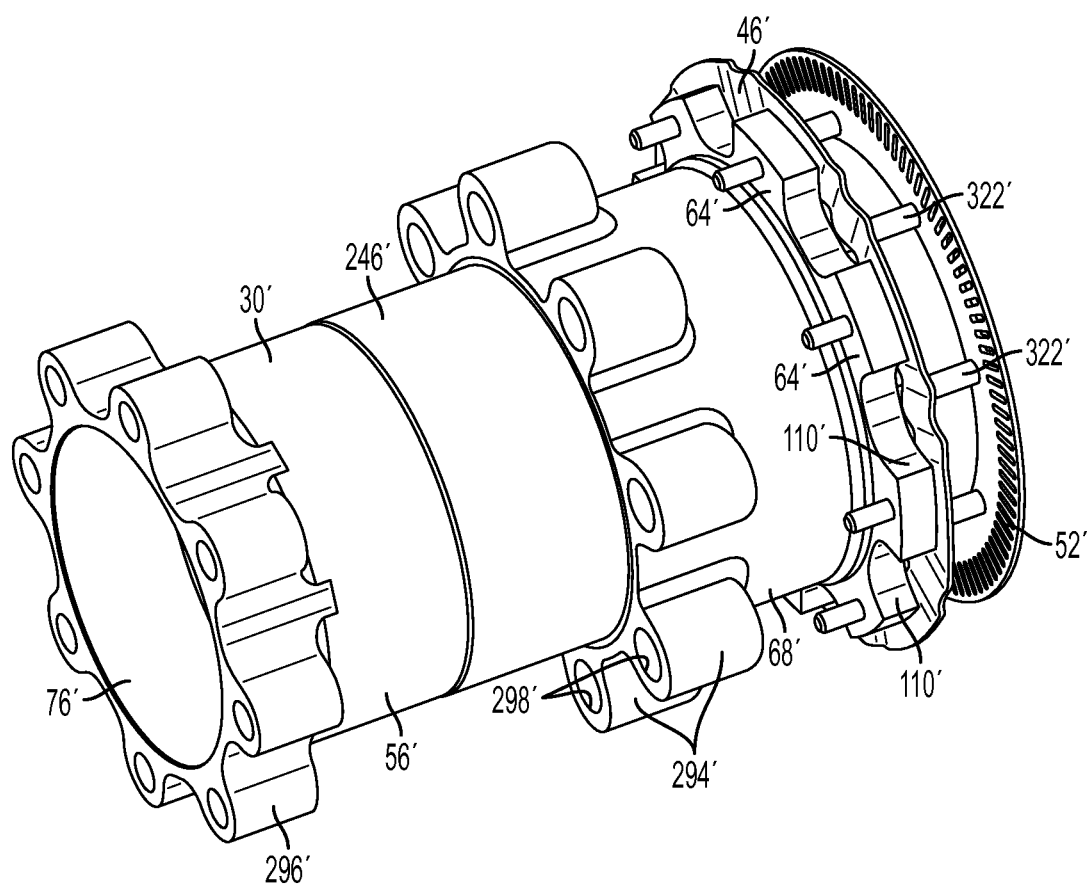
FIGS. 40-42 illustrate various stages of assembly of the brake hub assembly of FIG. 37.
Figure 41:
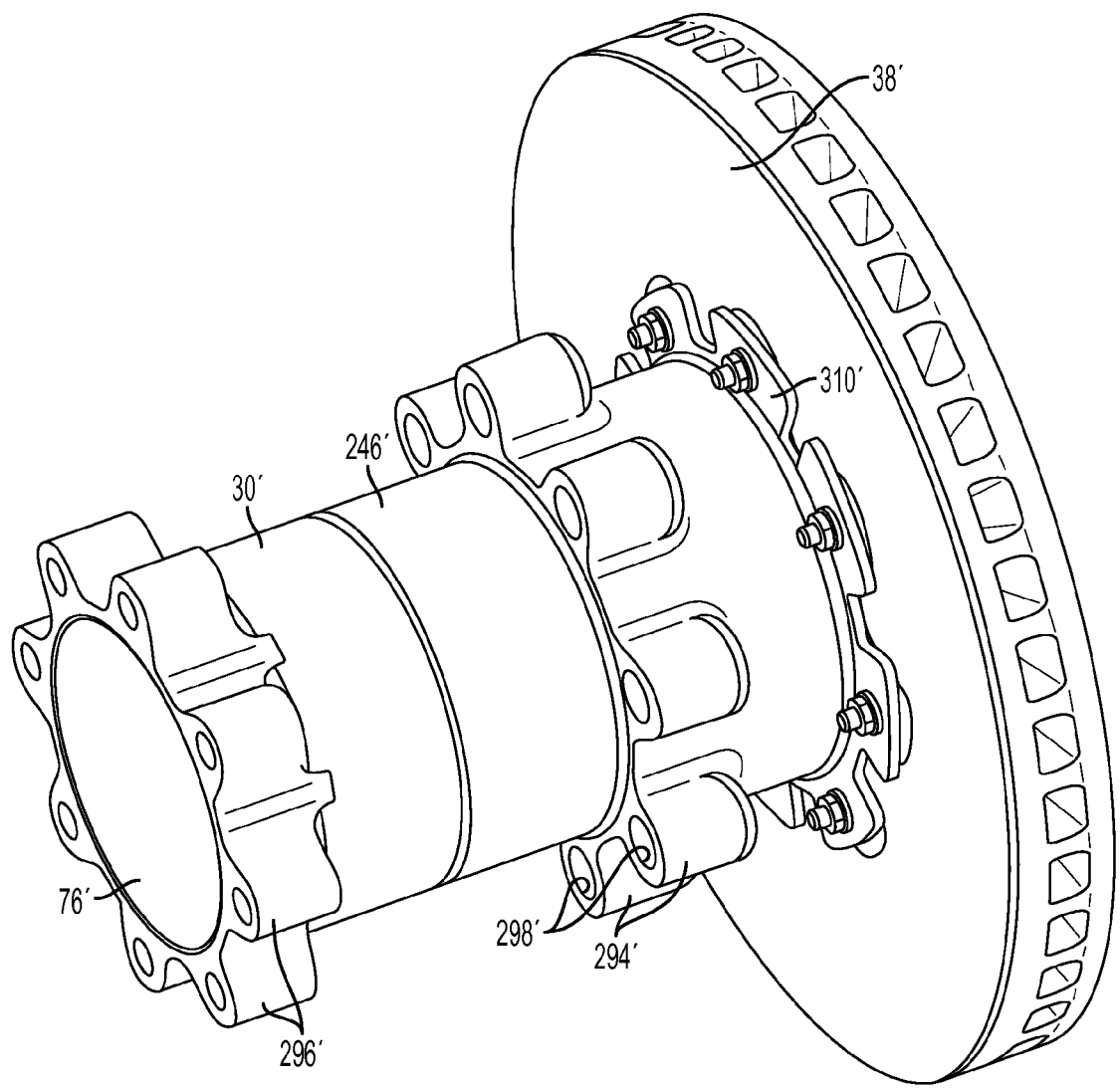
Figure 42:
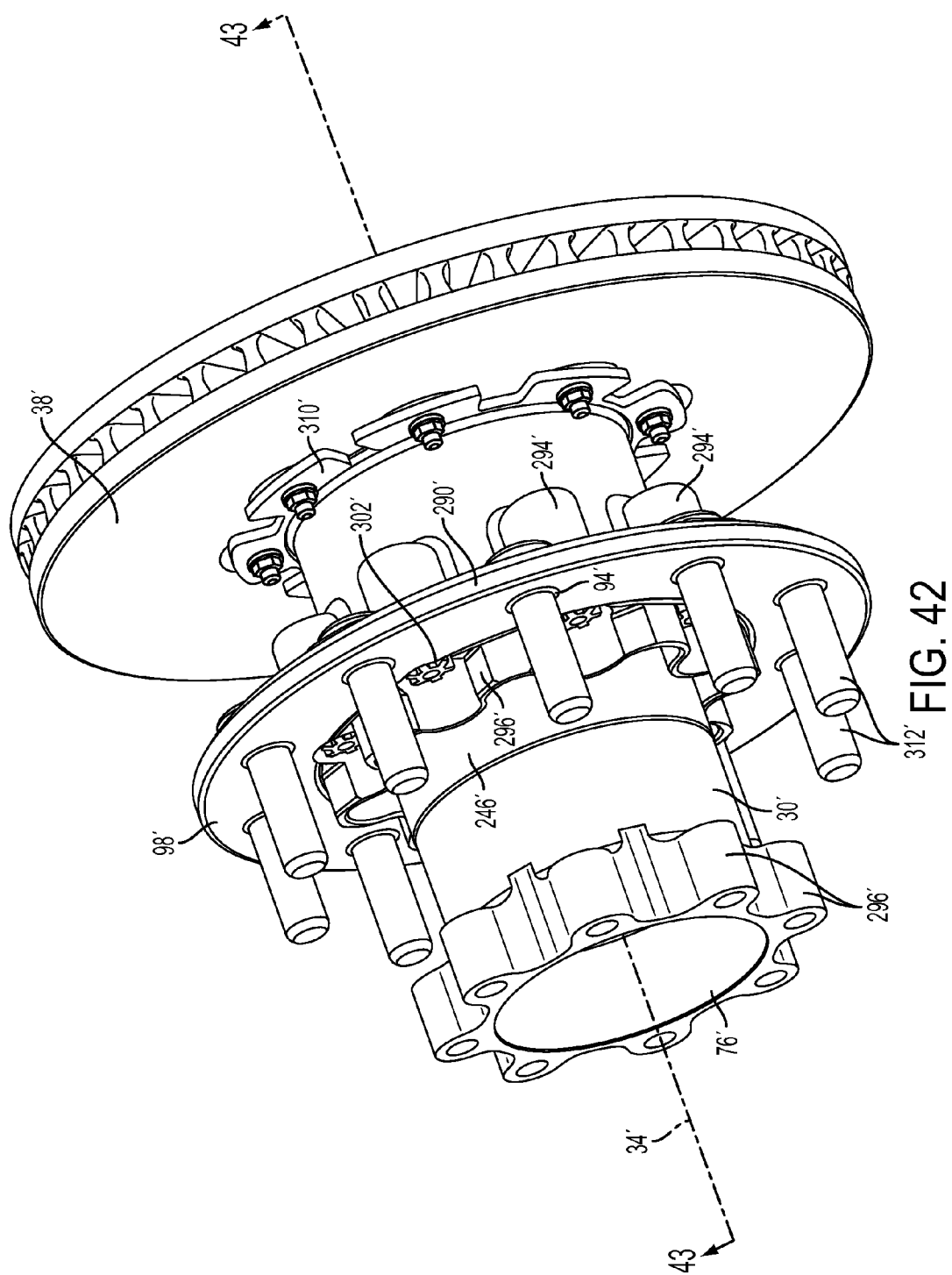
Figure 43:
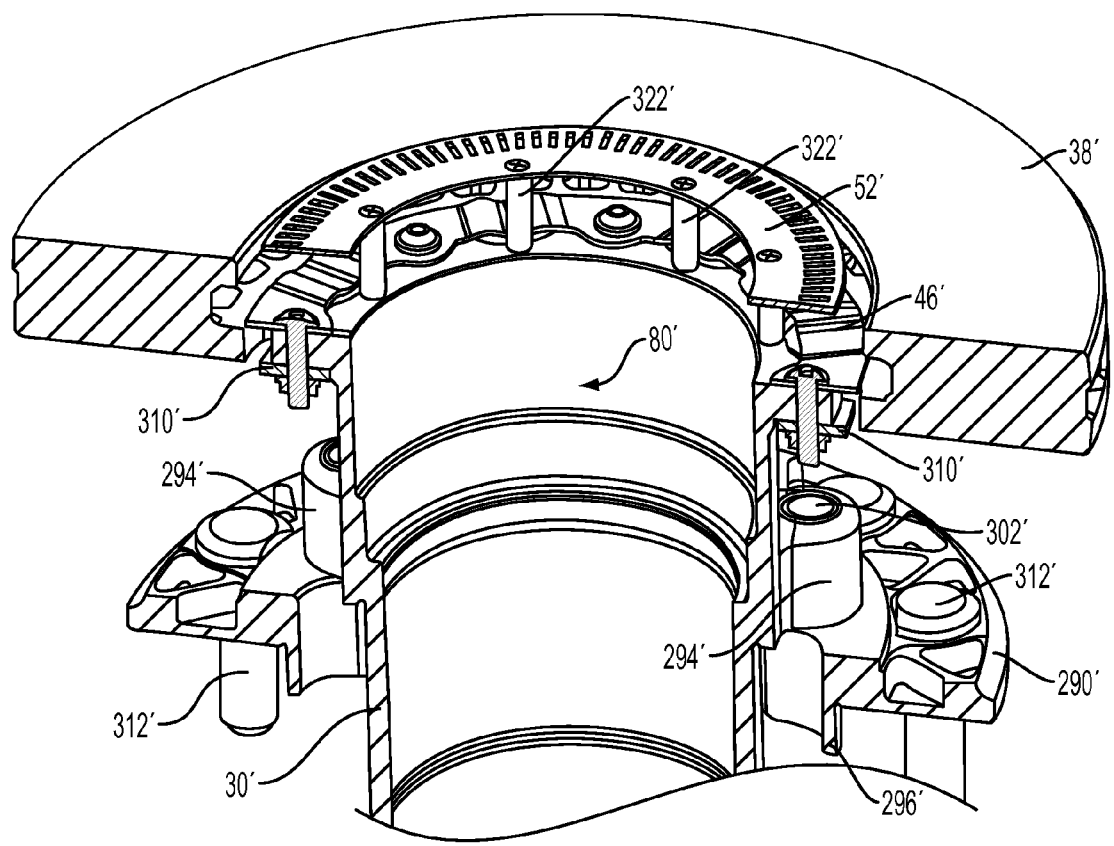
FIG. 43 is a section view taken along line 43-43 of FIG. 42.
Figure 44:
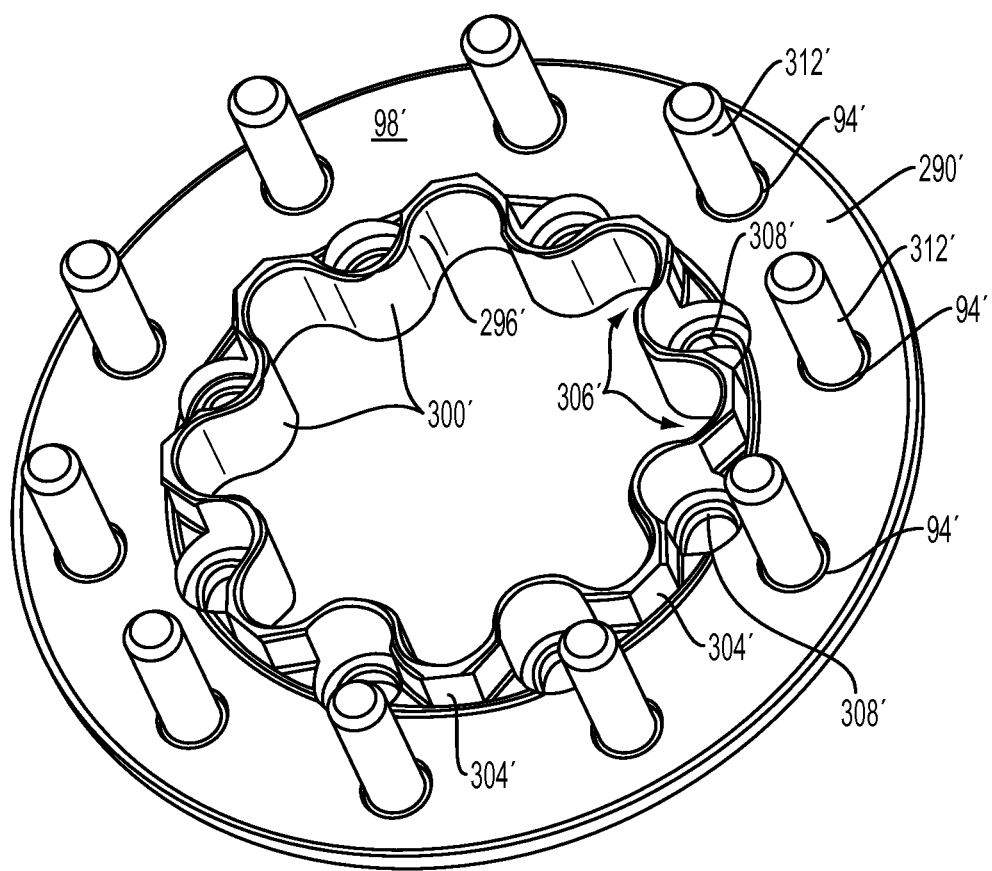
FIGS. 44-45 illustrate the wheel flange plate of the brake hub assembly of FIG. 38.
Figure 45:
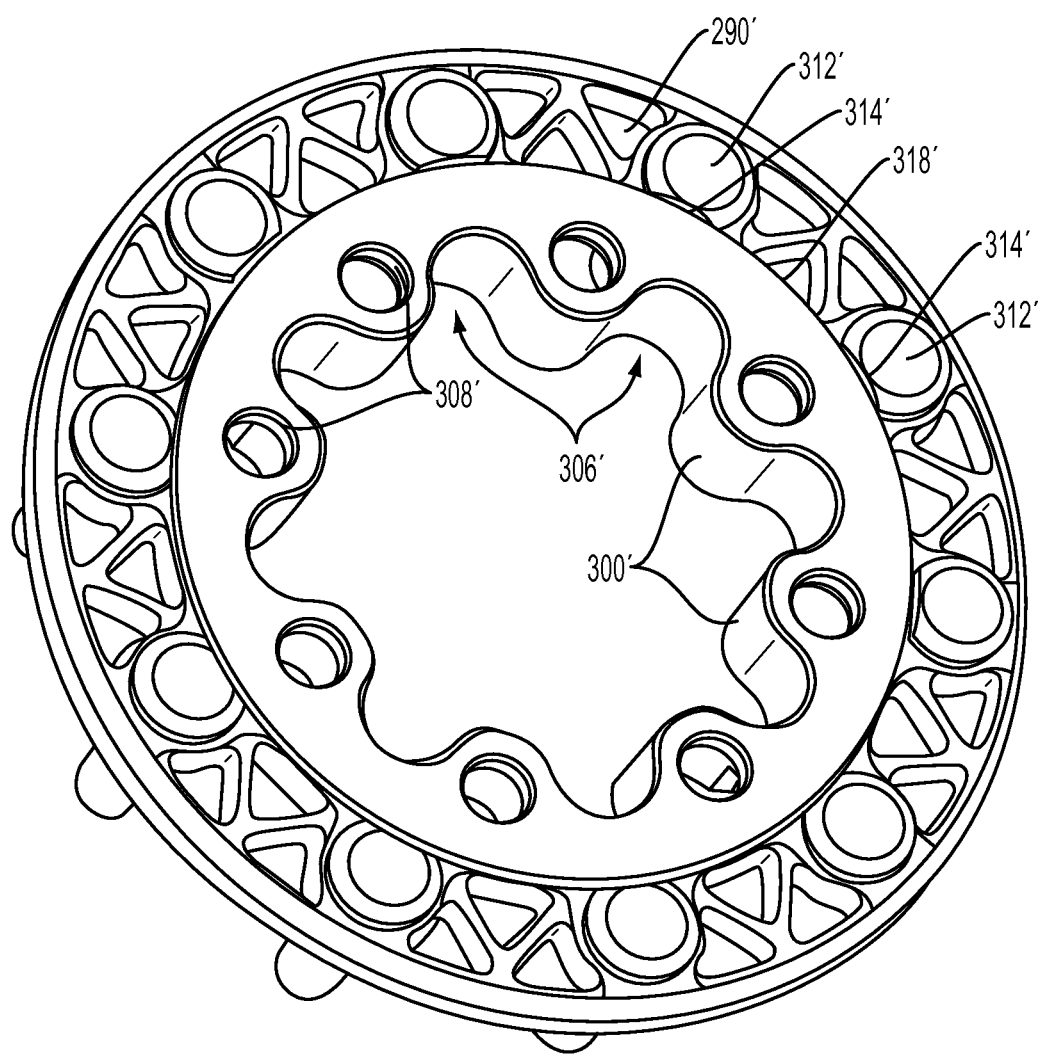

Illustrated in FIG. 39, the hub 30' of the hub assembly 26' includes a substantially cylindrical body 56', a plurality of torque lugs 64' positioned proximate the inboard end 68' of the hub body 56', a plurality of wheel lugs 294' positioned near the axial center of the hub body 56', and a plurality of threaded lugs 296' proximate the outboard end 76' of the hub body 56'. Similar to the previous hub designs, the body 56' of the hub 30' also defines an interior recess 80' that includes seats for the bearings of the bearing assembly and any necessary seals.

The torque lugs 64' extend radially outwardly from the body 56' proximate the inboard end 68'. The lugs 64' are formed integrally with the body 56' and are spaced equidistantly along its circumference. Similar to the torque lugs of the first and fourth hub embodiments 30a, 30d, each lug 64' of the hub 30' has a pair of substantially parallel side walls 110' configured to be received within and moveable along the slots 254' of the brake disk 38'.

The wheel lugs 294' extend radially outwardly from the body 56' near the axial center of the hub body. As with the torque lugs 64', the wheel lugs 294' are formed integrally with the hub body 56' and are spaced equidistantly along its circumference. Each wheel lug 294' includes an axially extending threaded aperture 298', configured to threadably receive a bolt 302'. In the illustrated construction, each wheel lug 294' is sized and spaced so that the brake disk 38' can slide past the lugs 294' without interference. More specifically, each wheel lug 294' is sufficiently small to pass through a corresponding radial slot 254' of the brake disk.

As best shown in FIGS. 39, 40, 44 and 45, the wheel flange plate 290' is substantially annular in shape and defines a plurality of wheel stud apertures 94'. The wheel flange plate 290' also includes a wall 296' extending perpendicular to the mounting surface 98' and along the inner circumference of the plate 290'. Wall 296' varies in radial distance from the central axis 34' and defines a plurality of hub pilots 300' at a first radial distance from the central axis 34' and a plurality of wheel pilots 304' at a second, greater radial distance from the central axis 34' (see FIG. 44). More specifically, the hub pilots 300' are configured to engage the pilot cylinder 246' of the hub 30' and co-axially align the plate 290' with the central axis 34' and the wheel pilots 304' are configured to maintain the concentricity between the plate 290' and the wheel. The wall 296' also provides rigidity to the plate 290'.

The plate 290' also defines a plurality of notches 306', each positioned between a pair of hub pilots 300' and sized slightly larger than a threaded lug 298' of the hub 30'. The plate 290' also defines a plurality of mounting apertures 308', each positioned between a pair of notches 306' and sized to receive a bolt 302'. In the illustrated construction, the apertures 308' are recessed axially from the mounting surface 98' so the bolts 302' will not interfere with the wheel when it is installed on the hub 30'. Interference can be best avoided by using "low profile" bolts if necessary.

The wheel flange plate 290' can be formed from austempered ductile iron. As such, the material of the plate 290' is similar in hardness to the material of typical wheel studs 312'. The similar hardness of the plate 290' and stud 312' require that the studs 312' be pressed into the plate 290'. To restrict the studs 312' from rotating once installed, a notch 314' is formed in the stud 312'. Once the stud 312' is installed on the plate 290', the notch 314' contacts a flange or raised surface 318', formed in the plate 290', thereby restricting the stud 312' from rotating with respect to the plate 290' (see FIG. 45).

The brake hub assembly 26' also includes a pair of stopping plates 310'. Each plate 310' is substantially semi-annular in shape and is configured to be bolted to the outboard side of the torque lugs 64' to establish an outboard travel stop for disk 38' on the hub 30'. In the illustrated construction, the stopping plates 310' work in tandem with the axial preload spring 46, which acts as an inboard travel stop for disk 38' and applies a constant outboard force to bias the disk 38 against the stopping plates 310'. In the illustrated construction, each stopping plate 310' extends roughly half the circumference of the hub 30' so the stopping plates 310' can be installed without needing to slide them along the length of the hub 30'. However, in alternate constructions, an annular piece may be used.

To assemble the hub assembly 26', the user couples the axial preload spring 46' to the inboard side of the torque lugs 64' with a set of stand off screws and couples the tone ring 52' to the extension portion of the stand off screws (not shown). In other constructions, the user may couple the axial preload spring 46' directly to the lugs 64' using a standard fastener while coupling the tone ring 52' to the hub 30' using a set of independent standoff poles 322' (see FIGS. 40 and 43). The user can then install the hub 30' onto the axle of the motor vehicle with the proper bearings and seals as is well known in the art.

The user introduces the brake disk 38' axially over the outboard end 76' of the hub 30', sliding the disk 38 in an inboard direction along the hub 30', passing the threaded lugs 296' and the wheel lugs 294' until the disk 38' contacts the axial preload spring 46'. The user couples (e.g., bolts) the stopping plates 310' to the outboard side of the torque lugs 64', securing the brake disk 38' to the hub 30' between the preload spring 46' and the plates 310' (see FIG. 41).

The user then axially introduces the wheel flange plate 290' onto the outboard end 76' of the hub 30', moving the plate 290' in an inboard direction past the threaded lugs 296' and into engagement with the wheel lugs 294'. The wheel flange plate 290' is coupled (e.g., bolted) to the wheel lugs 294' with bolts 302' (see FIG. 42).

If the brake disk 38' needs to be replaced during the lifetime of the hub assembly 26', the user can remove the brake disk 38' from the hub 30' without removing the hub 30' from the axle. To remove the brake disk 38', the user removes the wheel flange plate 290' from the hub 30' by unbolting the plate and sliding it in an outboard direction off the hub 30'. The user then removes the two stopping plates 310', and slides the brake disk 38' in an outboard direction along the hub body 56', passing over the wheel lugs 294' and the threaded lugs 296'. A new or refurbished brake disk 38' may then be re-installed on the hub 30' as described above. The axial preload spring 46', stand off screws 270' and tone ring 52' may remain attached to the hub 30' during both assembly and disassembly.

The invention claimed is:

1. A brake hub assembly couplable to an axle of a vehicle, the brake hub assembly comprising:
   a brake hub defining a central axis;
   a brake disk coupled to the brake hub, the brake disk having a first braking surface and a second braking surface spaced axially from the first braking surface, and wherein the brake disk defines a plurality of radially extending slots; and at least one torque member extending from the hub, wherein the torque member is at least partially received within and moveable along one of the plurality of radially extending slots of the brake disk, and wherein the torque member includes a spacer to which one of the first or second braking surfaces of the brake disk is engaged for axially separating the brake disk from the hub;

wherein the torque member transmits torque between the brake disk and the brake hub, and wherein the spacer is integrally formed with the torque member.

2. The brake hub assembly of claim 1, wherein the torque member is positioned axially between one of the first or second braking surface and the brake hub.

3. The brake hub assembly of claim 1, wherein the torque member is formed from material having a thermal conductivity less than the thermal conductivity of a material forming the brake hub.

4. The brake hub assembly of claim 3, wherein the material forming the torque member has a thermal conductivity between about 2% and about 25% of the thermal conductivity of the material forming the brake hub.

5. The brake hub assembly of claim 4, wherein the hub is formed of aluminum.

6. The brake hub assembly of claim 1, wherein the spacer includes a first portion located on a first side of the torque member and a second portion located on an opposite, second side of the torque member, wherein the first and second portions of the spacer are both engaged with the first braking surface, and wherein the first and second portions of the spacer are non-contiguous.

7. The brake hub assembly of claim 6, wherein each of the first and second portions of the spacer is radially oriented.

8. The brake hub assembly of claim 1, wherein the one of the first or second braking surfaces of the brake disk to which the spacer is engaged lies within a single plane.

9. The brake hub assembly of claim 1, wherein the brake disk includes
  a first plate on which the first braking surface is defined,
  a second plate on which the second braking surface is defined, the first and second plates separated by an axial spacing, and
  a plurality of ribs extending between the first and second plates to define a plurality of cooling channels therebetween,
  wherein the spacer is engaged with the second braking surface, and wherein the torque member extends axially inboard from the second braking surface a distance not more than a thickness of the second plate plus about 50% of the spacing between the first and second plates.

10. A brake hub assembly couplable to an axle of a vehicle, the brake hub assembly comprising:
  a brake hub composed of a first material and defining a central axis;
  a brake disk coupled to the brake hub, the brake disk having a first braking surface and a second braking surface spaced axially from the first braking surface, and wherein the brake disk defines a plurality of radially extending slots; and
  at least one torque member extending from the hub, wherein the torque member is at least partially received within and moveable along one of the plurality of radially extending slots of the brake disk, wherein the torque member includes a spacer to which one of the first or second braking surfaces of the brake disk is engaged for axially separating the brake disk from the hub, and wherein the torque member is composed of a second material having a thermal conductivity less than the first material;

wherein the torque member transmits torque between the brake disk and the brake hub, and wherein the spacer is integrally formed with the torque member.

11. The brake hub assembly of claim 10, wherein the second material has a thermal conductivity between about 2% and about 25% of the thermal conductivity of the first material.

12. The brake hub assembly of claim 10, wherein the second material includes at least one of steel, stainless steel, ceramic, or any combination thereof.

13. The brake hub assembly of claim 10, wherein the brake hub is formed from aluminum.

14. The brake hub assembly of claim 10, wherein the spacer includes a first portion located on a first side of the torque member and a second portion located on an opposite, second side of the torque member, wherein the first and second portions of the spacer are both engaged with the first braking surface, and wherein the first and second portions of the spacer are non-contiguous.

15. The brake hub assembly of claim 14, wherein each of the first and second portions of the spacer is radially oriented.

16. The brake hub assembly of claim 10, wherein the one of the first or second braking surfaces of the brake disk to which the spacer is engaged lies within a single plane.

17. The brake hub assembly of claim 10, wherein the brake disk includes
  a first plate on which the first braking surface is defined,
  a second plate on which the second braking surface is defined, the first and second plates separated by an axial spacing, and
  a plurality of ribs extending between the first and second plates to define a plurality of cooling channels therebetween,
  wherein the spacer is engaged with the second braking surface, and wherein the torque member extends axially inboard from the second braking surface a distance not more than a thickness of the second plate plus about 50% of the spacing between the first and second plates.

18. A brake hub assembly couplable to an axle of a vehicle, the brake hub assembly comprising:
  a brake hub defining a central axis;
  a brake disk having a first braking surface and a second braking surface spaced axially from the first braking surface, and wherein the brake disk defines a plurality of radially extending slots; and
  a torque member extending between the brake disk and the brake hub to transmit torque therebetween, wherein the torque member is at least partially received within and moveable along one of the plurality of radially extending slots of the brake disk, and wherein the torque member includes a spacer engaged to one of the first or second braking surfaces of the brake disk to maintain a fixed axial gap between the brake disk and the brake hub.

19. The brake hub assembly of claim 18, wherein the torque member is integrally formed with the hub.

20. The brake hub assembly of claim 18, wherein at least a portion of the torque member is formed of tubular metal and includes a pair of substantially parallel walls.

21. The brake hub assembly of claim 18, wherein at least a portion of the torque member is formed from a cylindrical roll spring.

22. The brake hub assembly of claim 18, wherein the radially extending slots are defined by the first or second braking surfaces.

23. The brake hub assembly of claim 18, wherein at least a portion of the torque member includes a stud coupled to the brake hub and a cap coupled to the stud.

24. The brake hub assembly of claim 23, wherein the stud includes a cylindrical roll spring.

25. The brake hub assembly of claim 18, wherein the torque member is moveable along one of the plurality of radially extending slots of the brake disk in response to thermal expansion and contraction of the brake disk.

26. The brake hub assembly of claim 18, wherein the torque member is coupled to the hub by at least one of a fastener, press fit, and peening.

27. The brake hub assembly of claim 18, wherein the spacer includes a first portion located on a first side of the torque member and a second portion located on an opposite, second side of the torque member, wherein the first and second portions of the spacer are both engaged with the first braking surface, and wherein the first and second portions of the spacer are non-contiguous.

28. The brake hub assembly of claim 27, wherein each of the first and second portions of the spacer is radially oriented.

29. The brake hub assembly of claim 18, wherein the one of the first or second braking surfaces of the brake disk to which the spacer is engaged lies within a single plane.

30. The brake hub assembly of claim 18, wherein the brake disk includes
 a first plate on which the first braking surface is defined,
 a second plate on which the second braking surface is defined, the first and second plates separated by an axial spacing, and
 a plurality of ribs extending between the first and second plates to define a plurality of cooling channels therebetween,
 wherein the spacer is engaged with the second braking surface, and wherein the torque member extends axially inboard from the second braking surface a distance not more than a thickness of the second plate plus about 50% of the spacing between the first and second plates.

* * * * *